(12) United States Patent
Horiuchi et al.

(10) Patent No.: US 12,401,978 B2
(45) Date of Patent: *Aug. 26, 2025

(54) BASE STATION, TERMINAL, TRANSMISSION METHOD, AND RECEPTION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,915

(22) Filed: Jun. 27, 2024

(65) Prior Publication Data

US 2024/0349025 A1 Oct. 17, 2024

Related U.S. Application Data

(63) Continuation of application No. 17/725,089, filed on Apr. 20, 2022, now Pat. No. 12,052,642, which is a (Continued)

(30) Foreign Application Priority Data

Jul. 24, 2015 (JP) .................................. 2015-147014
Aug. 7, 2015 (JP) .................................. 2015-156990

(51) Int. Cl.
*H04W 72/04* (2023.01)
*H04L 5/00* (2006.01)
(Continued)

(52) U.S. Cl.
CPC ............. *H04W 4/70* (2018.02); *H04L 5/0048* (2013.01); *H04L 5/0053* (2013.01);
(Continued)

(58) Field of Classification Search
None
See application file for complete search history.

(56) References Cited

U.S. PATENT DOCUMENTS 9,065,527 B2 6/2015 Hoshino et al.
9,295,045 B2 3/2016 Horiuchi et al.
(Continued)

FOREIGN PATENT DOCUMENTS

WO 2013044948 A1 4/2013

OTHER PUBLICATIONS

3GPP TR 36.888 V12.0.0, "3rd Generation Partnership Project; Technical Specification Group Radio Access Network; Study on provision of low-cost Machine-Type Communications (MTC) User Equipments (UEs) based on LTE," Jun. 26, 2013. 55 pages.
(Continued)

*Primary Examiner* — Willie J Daniel, Jr.
(74) *Attorney, Agent, or Firm* — Seed IP Law Group LLP

(57) ABSTRACT

In a base station, control circuitry determines, based on an offset for defining a frequency position of a narrowband allocated to an MPDCCH and a resource block group size of a system band, allocations of a first EPDCCH set and a second EPDCCH set that constitute the MPDCCH. The MPDCCH is a PDCCH for MTC. The second EPDCCH set has a different number of PRBs from the first EPDCCH set. A transmitter transmits a control signal according to the allocations of the first EPDCCH set and the second EPDCCH set. Further, the control circuitry controls a number of RBGs in which both the first EPDCCH set and the second EPDCCH set are allocated to be zeto or one.

8 Claims, 20 Drawing Sheets

Related U.S. Application Data continuation of application No. 15/810,589, filed on Nov. 13, 2017, now Pat. No. 11,343,661, which is a continuation of application No. PCT/JP2016/002719, filed on Jun. 6, 2016.

(51) Int. Cl.
  *H04W 4/70* (2018.01)
  *H04W 4/029* (2018.01)
  *H04W 4/35* (2018.01)
  *H04W 4/38* (2018.01)

(52) U.S. Cl.
  CPC ........... *H04L 5/0051* (2013.01); *H04W 4/029* (2018.02); *H04W 4/35* (2018.02); *H04W 4/38* (2018.02)

(56) References Cited

U.S. PATENT DOCUMENTS

| | | |
|---|---|---|
| 9,515,759 B2 | 12/2016 | Kim et al. |
| 11,343,661 B2 * | 5/2022 | Horiuchi ............... H04L 5/0053 |
| 12,052,642 B2 * | 7/2024 | Horiuchi ................ H04W 4/70 |
| 2014/0307692 A1 | 10/2014 | Hong |
| 2015/0036609 A1 | 2/2015 | Kim et al. |

OTHER PUBLICATIONS

3GPP TSG RAN WG1 #81, R1-153567, "WF on Narrowband Definition for Rel-13 MTC UEs," May 25, 2015. 5 pages.

International Search Report of PCT application No. PCT/JP2016/002719, dated Aug. 16, 2016. 9 pages.

ZTE, "PRB group definition and frequency hopping for MTC enhancement," 3GPP TSG RAN WG1 Meeting #81, R1-152954, Retrieved from the Internet on Aug. 4, 2016: <URL:http://www.3gpp.org/ftp/tsg_ran/ WG1_RL1/TSGR1_81/Docs/R1-152954.zip>, May 15, 2015. pp. 1-8.

* cited by examiner

FIG. 3

|        | RBG=2 | Offset 0 | Offset 1 |
|--------|-------|----------|----------|
| PRB#6  | RBG#3 |          |          |
| PRB#5  | RBG#2 |          |          |
| PRB#4  |       |          | 6PRBs    |
| PRB#3  | RBG#1 | 6PRBs    |          |
| PRB#2  |       |          |          |
| PRB#1  | RBG#0 |          |          |
| PRB#0  |       |          |          |

FIG. 4

|        | RBG=2 | Offset 0 | Case 1 | Case 2 | Case 3 |
|--------|-------|----------|--------|--------|--------|
| PRB#6  | RBG#3 |          |        |        |        |
| PRB#5  | RBG#2 |          | set 0  | set 0  | set 1  |
| PRB#4  |       |          |        |        |        |
| PRB#3  | RBG#1 | 6PRBs    |        | set 1  | set 0  |
| PRB#2  |       |          |        |        |        |
| PRB#1  | RBG#1 |          | set 1  | set 0  |        |
| PRB#0  |       |          |        |        |        |

FIG. 5

| | RBG=2 | Offset 1 | Case 1 | Case 2 | Case 3 |
|---|---|---|---|---|---|
| PRB#6 | RBG#3 | | set 1 | set 0 | set 0 |
| PRB#5 | RBG#2 | | set 0 | | set 1 |
| PRB#4 | | 6PRBs | | | |
| PRB#3 | RBG#1 | | | set 1 | set 0 |
| PRB#2 | | | | | |
| PRB#1 | RBG#0 | | set 1 | set 0 | |
| PRB#0 | | | | | |

FIG. 6

| | RBG=3 | offset 0 | offset 1 | offset 2 |
|---|---|---|---|---|
| PRB#8 | | | | |
| PRB#7 | RBG#2 | | | |
| PRB#6 | | | | |
| PRB#5 | | | | 6PRBs |
| PRB#4 | RBG#1 | | 6PRBs | |
| PRB#3 | | 6PRBs | | |
| PRB#2 | | | | |
| PRB#1 | RBG#0 | | | |
| PRB#0 | | | | |

| RRC signaling | 00 | 01 | 10 | 11 | | | | |
|---|---|---|---|---|---|---|---|---|
| RBG size | | | | 1 | 2 | 3 | 4 | |
| Offset | | | | 0 | 1 | 2 | 0 | 1 | 2 | 0 | 1 | 2 | 3 |
| Case | | | | 2 | 2 | 2 | 2 | 2 | 2 | 2 | 2 | 2 | 2 |
| PRB#L | | | | | | | | |
| PRB#K | | | | | | | | |
| PRB#J | | | | | | | | |
| PRB#I | | | | | | | | |
| PRB#H | | | | | | | | |
| PRB#G | | | | | | | | |
| PRB#F | | | | | | | | |
| PRB#E | | | | | | | | |
| PRB#D | | | | | | | | |
| PRB#C | | | | | | | | |
| PRB#B | | | | | | | | |
| PRB#A | | | | | | | | |

SAME ALLOCATION AS NARROWBAND BELOW

BASE STATION, TERMINAL, TRANSMISSION METHOD, AND RECEPTION METHOD

BACKGROUND

1. Technical Field

The present disclosure relates to a base station, a terminal, a transmission method, and a reception method that are used in MTC (Machine-Type Communications).

2. Description of the Related Art

In recent years, Machine-Type Communications (MTC) based on cellular networks have been studied (see, for example, 3GPP TR 36.888 V12.0.0 Machine-Type Communications (MTC) User Equipments (UEs) based on LTE). Possible applications of MTC include automatic meter reading of smart meters, inventory management, logistics management based on positional information, pet and livestock management, and mobile payment. In MTC, MTC terminals are supposed to be connected to networks. While MTC terminals are placed on a massive scale, it is anticipated that every single MTC terminal will not have that large amount of traffic. For this reason, MTC terminals are required to be low in both cost and power consumption. Further, MTC terminals are required to be wider in coverage, as they may be placed in a basement of a building, where radio waves hardly reach, and similar places.

In LTE-Advanced enhancement standardized by the 3GPP, it has been under consideration that, for reduction of cost of MTC terminals, the resources that an MTC terminal uses for communication are limited to six or less PRBs (physical resource blocks) regardless of system band. In a case where the system band is wider than six PRBs, the MTC terminal performs transmission and reception by receiving only a part of the system band. The PRBs to be used for transmission and reception can be changed by retuning. This resource of six or less PRBs is called "narrowband". It is specified that a narrowband is composed of contiguous PRBs. As a definition of a narrowband, there have been proposed a method for constituting a narrowband by dividing six PRBs from each end of the band and a method for constituting a narrowband by dividing six PRBs from the center of the band (see, for example, R1-153567 "WF on Narrowband Definition for Rel-13 MTC UEs").

In LTE, an RBG size that indicates the number of RBs that constitute one RBG (resource block group) is specified according to the number of RBs that is included in the system band. An RBG is a resource that is obtained by sequentially separating, from an end of the band, contiguous PRBs whose number is determined by the RBG size. The RBG size is a parameter that is used in DL resource assignments type 0 and type 1. In resource assignment type 1, resources are assigned on an RBG-by-RBG basis. In type 1, each RBG is composed of a plurality of RBs that belong to any subset. The number of subsets is the same as the RBG size. Resource assignment is performed by selecting a subset first and then assigning a resource to each of the PRBs in an RBG that belong to the subset thus selected. In this way, an RBG pertains to a unit of resource assignment of a conventional terminal (legacy UE).

An MPDCCH, which is obtained by enhancing an EPDCCH (enhanced physical downlink control channel) for MTC, has been studied as a control signal for an MTC terminal. An MPDCCH is allocated to a narrowband. For coverage enhancement, a method for assigning an MPDCCH to all of the six PRB pairs included in a narrowband has been studied. Note here that in a case where one ECCE is composed of four EREGs, the number of ECCEs that is included in the six PRB pairs is 24. An ECCE and an EREG are units of assignment of an EPDCCH, and each PRB pair includes sixteen EREGs. ECCEs come in either localized assignment in which one ECCE is composed of a plurality of EREGs that belong to the same PRB pair or distributed assignment in which one ECCE is composed of a plurality of EREGs that belong to different PRB pairs. It should be noted that a PRB pair is a unit of resource, expressed as 1 subframe (time direction)×12 subcarriers (frequency). When indicated only on a frequency axis, a PRB pair may be referred to simply as "PRB".

Definitions of a narrowband that is set for an MTC terminal may vary from cell to cell. A definition of a narrowband says which PRBs the narrowband is composed of. Particularly in UL, a PUCCH resource is ensured for a conventional terminal (legacy UE) and it is therefore conceivable that the PUCCH resource intended for the conventional terminal may be configured not to be included in an MTC narrowband. Since amounts of PUCCH resources vary from cell to cell, it is conceivable that definitions of a narrowband may vary from cell to cell. Furthermore, TDD specifies that the definition of a narrowband is the same for DL and UL, and FDD may require that the interval between a DL narrowband and an UL narrowband be kept constant. In this case, it is required that the definition of a narrowband be the same for DL and UL. In a case where the definition of a narrowband is the same for DL and UL, a DL narrowband is affected by the amount of UL PUCCH resource.

When definitions of a narrowband vary from cell to cell, RBGs that are included in the narrowband may vary from cell to cell. Relationships between MPDCCH allocations and RBGs vary from cell to cell, and RBGs that become unable to be used for the conventional terminal vary from cell to cell, so that one MPDCCH may occupy unnecessarily many RBGs.

SUMMARY

One non-limiting and exemplary embodiment provides a base station and a terminal that make it possible to reduce the number of RBGs that become unusable due to the use of an MPDCCH and make it unnecessary to notify fine settings of MPDCCHs according to offsets that vary from base station to base station.

In one general aspect, the techniques disclosed here feature a base station including: control circuitry that determines, based on an offset for defining a frequency position of a narrowband allocated to an MPDCCH and a resource block group (RBG) size of a system band, allocations of a first EPDCCH (enhanced physical downlink control channel) set and a second EPDCCH set that constitute the MPDCCH, the MPDCCH being a PDCCH (physical downlink control channel) for MTC (Machine-Type Communications), the second EPDCCH set having a different number of PRBs (physical resource blocks) from the first EPDCCH set; and a transmitter that transmits a control signal according to the allocations of the first EPDCCH set and the second EPDCCH set. In the base station, the control circuitry controls a number of RBGs in which both the first EPDCCH set and the second EPDCCH set are allocated to be zero or one.

An aspect of the present disclosure makes it possible to reduce the number of RBGs that become unusable due to the use of an MPDCCH and makes it unnecessary to notify fine settings of MPDCCHs according to offsets that vary from base station to base station.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram showing a relationship between a narrowband and RBGs in the case of an RBG size of 2;

FIG. 4 is a diagram showing a method of allocation in the case of an offset of 0;

FIG. 5 is a diagram showing a method of allocation in the case of an offset of 1;

FIG. 6 is a diagram showing a relationship between a narrowband and RBGs in the case of an RBG size of 3;

FIG. 7 is a diagram showing a method of allocation in the case of an offset of 0;

FIG. 8 is a diagram showing a method of allocation in the cases of offsets of 1 and 2;

FIG. 9 is a diagram showing a relationship between narrowbands and RBGs in the case of an RBG size of 4;

FIG. 16 is a diagram showing an example of allocation in a case where MPDCCHs within a narrowband are assigned by 2 bits of RRC signaling per band;

FIG. 19 is a diagram for explaining mirroring of Embodiment 3;

FIG. 20 is a diagram for explaining a cyclic shift of Embodiment 3;

FIG. 21 is a diagram for explaining a cyclic shift of Embodiment 3;

DETAILED DESCRIPTION

Embodiments of the present disclosure are described in detail below with reference to the drawings.

Figure 1:
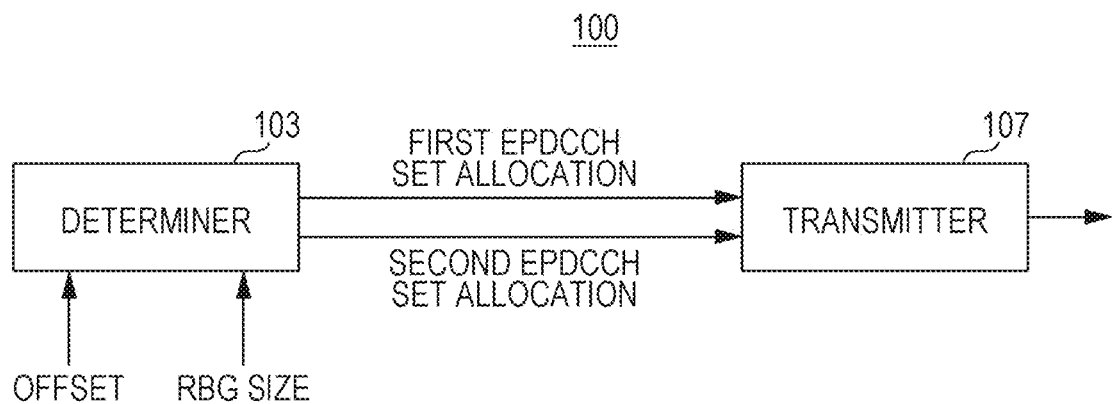
FIG. 1 is a block diagram showing the main components of a base station according to an embodiment.

FIG. 1 is a block diagram showing the main components of a base station 100 according to Embodiments 1 and 2 of the present disclosure. As shown in FIG. 1, the base station 100 includes a determiner (MPDCCH allocation determiner) 103 that determines the allocation of a first EPDCCH (enhanced physical downlink control channel) set and a second EPDCCH set that constitute an MPDCCH, the second EPDCCH set having a different number of PRBs (physical resource blocks) from the first EPDCCH set. The determination of the first EPDCCH set and the second EPDCCH set is performed on the basis of an offset for defining the frequency position of a narrowband to which the MPDCCH is assigned and a resource block group (RBG) size of a system band. Note here that the MPDCCH represents a PDCCH (physical downlink control channel) for use in MTC. The base station 100 also includes a transmitter 107 that transmits a control signal on the basis of the allocation of the first EPDCCH set and the second EPDCCH set. Further, the determiner 103 allocates the first EPDCCH set and the second EPDCCH set so that at least either of the EPDCCH sets collides with a minimum number of RBGs.

Figure 2:
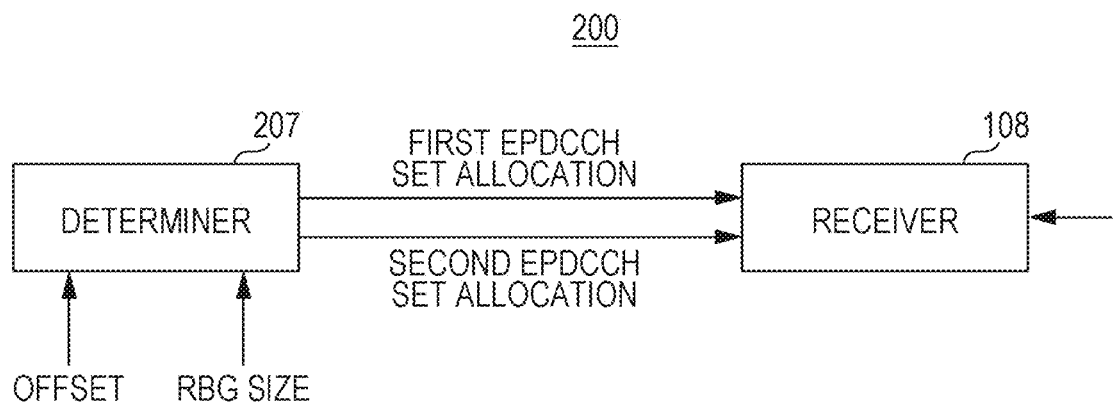
FIG. 2 is a block diagram showing the main components of a terminal according to an embodiment.

FIG. 2 is a block diagram showing the main components of a terminal 200 according to Embodiments 1 and 2 of the present disclosure. As shown in FIG. 2, the terminal 200 includes a determiner (MPDCCH allocation determiner) 207 determines the allocation of a first EPDCCH set and a second EPDCCH set that constitute an MPDCCH, the second EPDCCH set having a different number of PRBs from the first EPDCCH set. The determination of the first EPDCCH set and the second EPDCCH set is performed on the basis of an offset for defining the frequency position of a narrowband to which the MPDCCH is assigned and a resource block group (RBG) size of the system band. The terminal 200 also includes a receiver 108 that receives a control signal on the basis of the allocation of the first EPDCCH set and the second EPDCCH set. Further, the determiner 207 allocates the first EPDCCH set and the second EPDCCH set so that at least either of the EPDCCH set collides with a minimum number of RBGs.

Embodiment 1

In Embodiment 1, a narrowband has a size of 6 PRBs, and an MPDCCH is formed by two EPDCCH PRB sets. An EPDCCH set 0 is composed of four PRBs, and an EPDCCH set 1 is composed of two PRBs.

Example Operation: RBG Size of 2

In the case of an RBG size of 2, there are two patterns of positional relationship between a narrowband and RBGs as shown in FIG. 3, depending on the value of an offset. In the case of an offset of 0, one narrowband includes three RBGs. In the case of an offset of 1, one narrowband includes four RBGs, and of the four RBGs, the RBGs at both ends each include one PRB.

In the case of an offset of 0, an MPDCCH is allocated so that the EPDCCH set 1 (two PRBs) corresponds to one RBG in the narrowband, and the EPDCCH set 0 (four PRBs) corresponds to the remaining two RBGs. As shown in FIG.

4, there are three cases of allocation methods. In each of Cases 1 and 3, the EPDCCH set 0 is allocated to four contiguous PRBs. These allocations, which set the same antenna precoding for these four PRBs of the EPDCCH set 0, are allocations suited to PRB bundling that improves DMRS (demodulation reference signal) reception quality. Meanwhile, in Case 2, the EPDCCH set 0 is allocated to two PRBs at both ends. This brings about a frequency diversity effect within the narrowband of the EPDCCH set 0.

As shown in FIG. 5, there are three cases of allocation methods in the case of an offset of 1. Case 1 is a method for allocating an MPDCCH so that the EPDCCH set 0 (four PRBs) corresponds to two RBGs in the narrowband and the EPDCCH set 1 corresponds to the remaining RBGs. In each of Cases 2 and 3, the MPDCCH is allocated so that the EPDCCH set 1 (two PRBs) corresponds to one RBG in the narrowband and the EPDCCH set 0 corresponds to the remaining RBGs. That is, in Case 1, the EPDCCH set 0 is allocated to two RBGs, and the EPDCCH set 1 is allocated to two RBGs. In each of Cases 2 and 3, the EPDCCH set 0 is allocated to three RBGs, and the EPDCCH set 1 is allocated to one RBG. Therefore, Case 1, which is smaller than Cases 2 and 3 in terms of the number of RBGs to which the EPDCCH set 0 is allocated, is suited to a case where the EPDCCH set 0 is frequently used. Meanwhile, Cases 2 and 3, which are smaller than Case 1 in terms of the number of RBGs to which the EPDCCH set 1 is allocated, are suited to a case where the EPDCCH set 1 is frequently used.

Example Operation: RBG Size of 3

In the case of an RBG size of 3, there are three patterns of positional relationship between a narrowband and RBGs as shown in FIG. 6, depending on the value of an offset. In the case of an offset of 0, one narrowband includes two RBGs. In the case of an offset of 1 and the case of an offset of 2, one narrowband includes three RBGs including three PRBs, two PRBs, and one PRB respectively, as resources for use in the narrowband.

Figure 7:
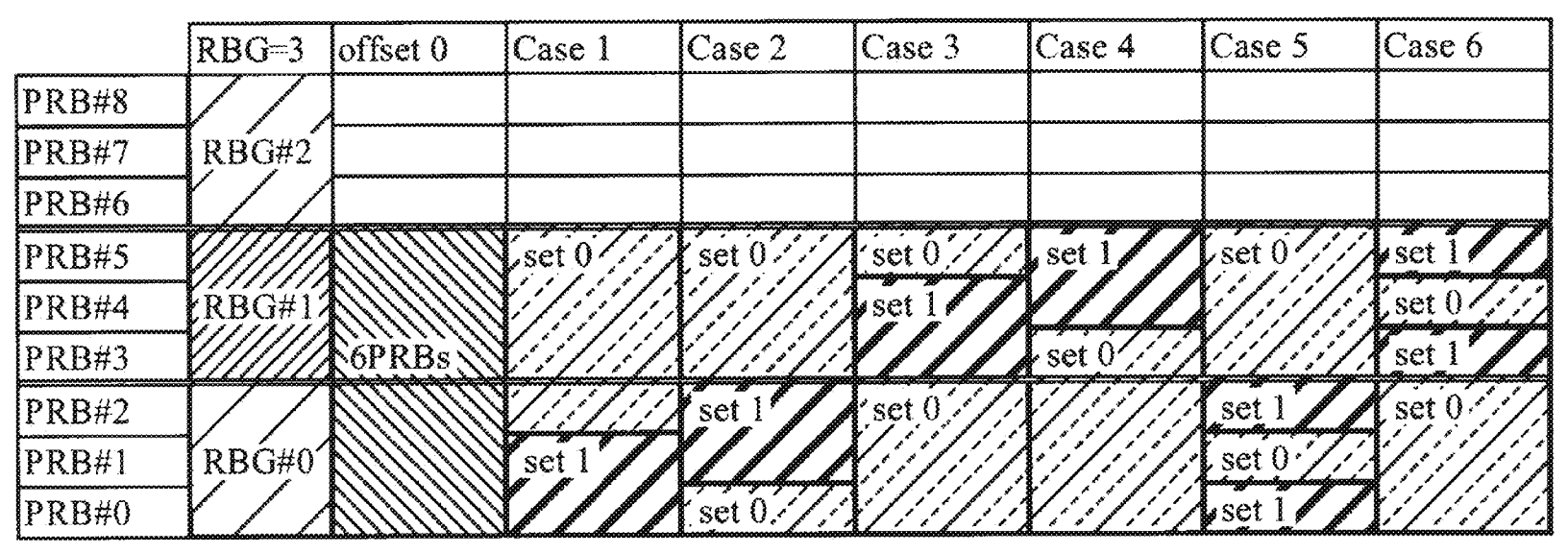

In the case of an offset of 0, the EPDCCH set 1 (two PRBs) is allocated to two PRBs of one RBG, and the EPDCCH set 0 is allocated to a total of four PRBs, namely the remaining one PRB and the three PRBs of the other RBG. In the case of an offset of 0, there are six possible cases of allocation methods as shown in FIG. 7. Cases 1 and 4, where the EPDCCH set 0 is allocated to four contiguous PRBs, are assignments suited to PRB bundling of the EPDCCH set 0. Further, Cases 2, 3, 5, and 6 bring about a frequency diversity effect within the narrowband of the EPDCCH set 0.

Figure 8:
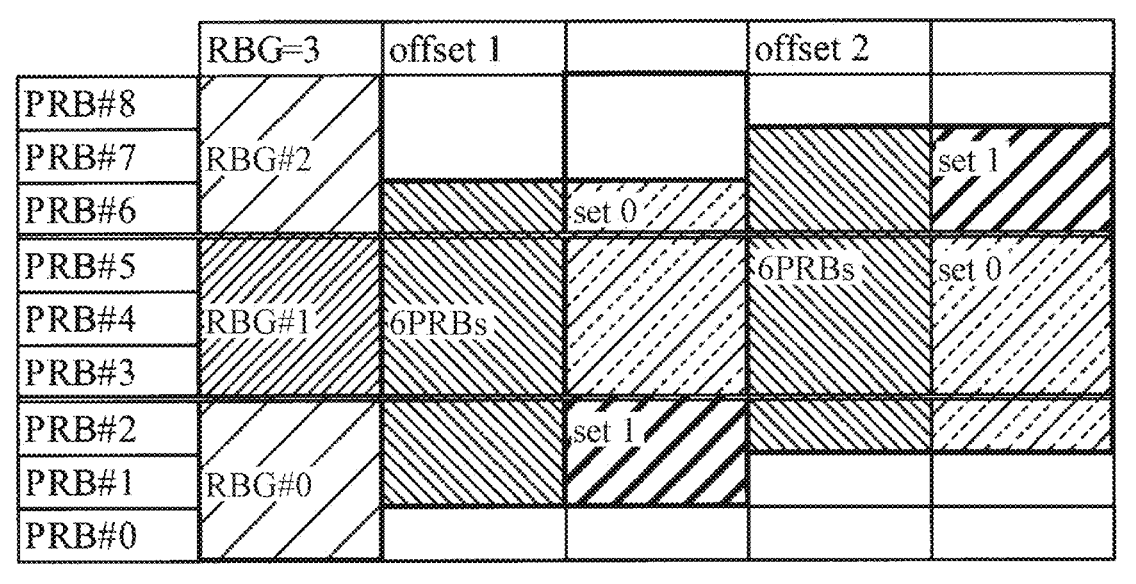

In the case of an offset of 1 or 2, the EPDCCH set 1 (two PRBs) is allocated to PRBs corresponding to an RBG having two PRBs included in the narrowband, and the EPDCCH set 0 (four PRBs) is allocated to a PRB corresponding to an RBG having one PRB included in the narrowband and PRBs corresponding to an RBG having three PRBs included in the narrowband. In each of the cases of an offset of 1 and an offset of 2, the allocation of the EPDCCHs is uniquely determined as shown in FIG. 8.

In the case of an RBG size of 3, this allocation allows the EPDCCH set 1 to be always allocated to one RBG and the EPDCCH set 0 to be always allocated to two RBGs.

Example Operation: RBG Size of 4

Figure 9:
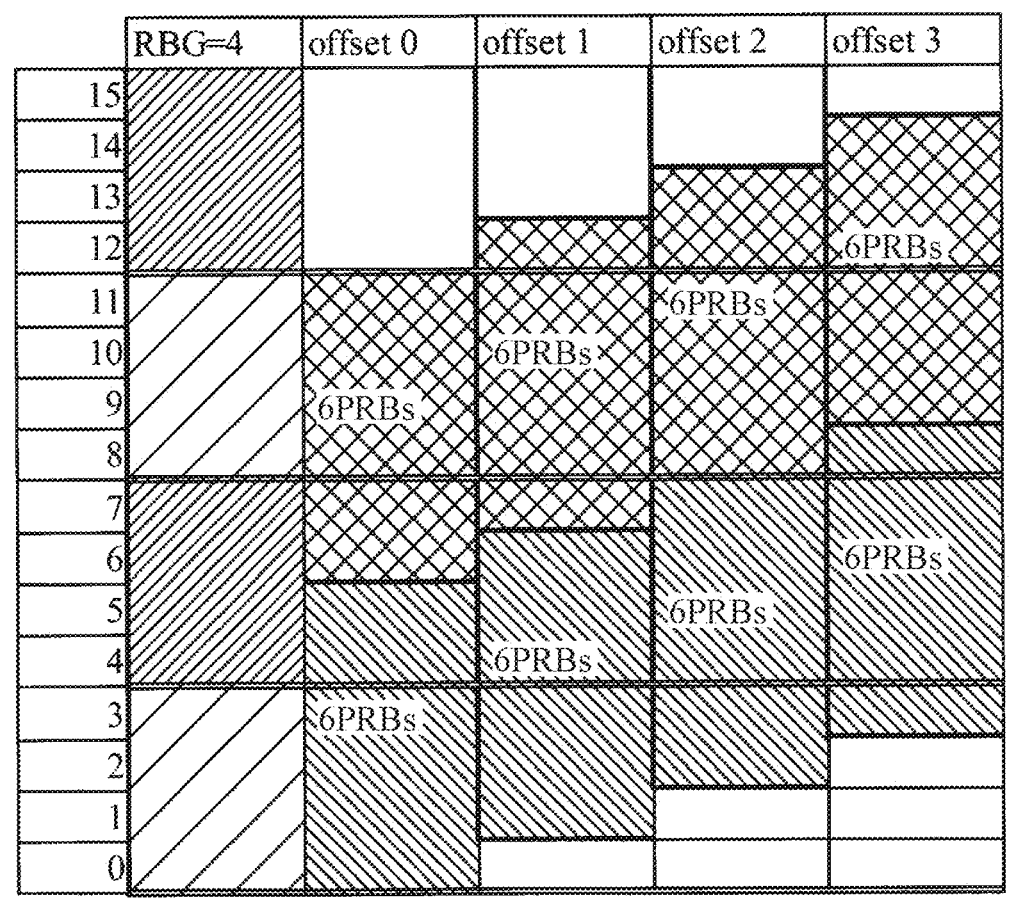

In the case of an RBG size of 4, there are four patterns of positional relationship between narrowbands and RBGs as shown in FIG. 9, depending on the value of an offset. Further, two contiguous narrowbands differ in the allocation of RBGs that are included in the narrowbands. In each of the cases of an offset of 0 and an offset of 2, one narrowband includes two RBGs, one of which includes four PRBs as resources for use in the narrowband and the other of which includes two PRBs as resources for use in the narrowband. A case where an RBG of four PRBs is placed at an upper end of the narrowband and a case where an RBG of four PRBs is placed at a lower end of the narrowband alternate. In each of the cases of an offset of 1 and an offset of 3, a case where one narrowband includes two RBGs and a case where one narrowband includes three RBGs alternate. In a case where one narrowband includes two RBGs, each of the two RBGs includes three PRBs as resources for use in the narrowband. In a case where one narrowband includes three RBGs, one of which includes a total of four PRBs as resources for use in the narrowband and the other two of which each include one PRB as a resource for use in the narrowband.

Figure 10:
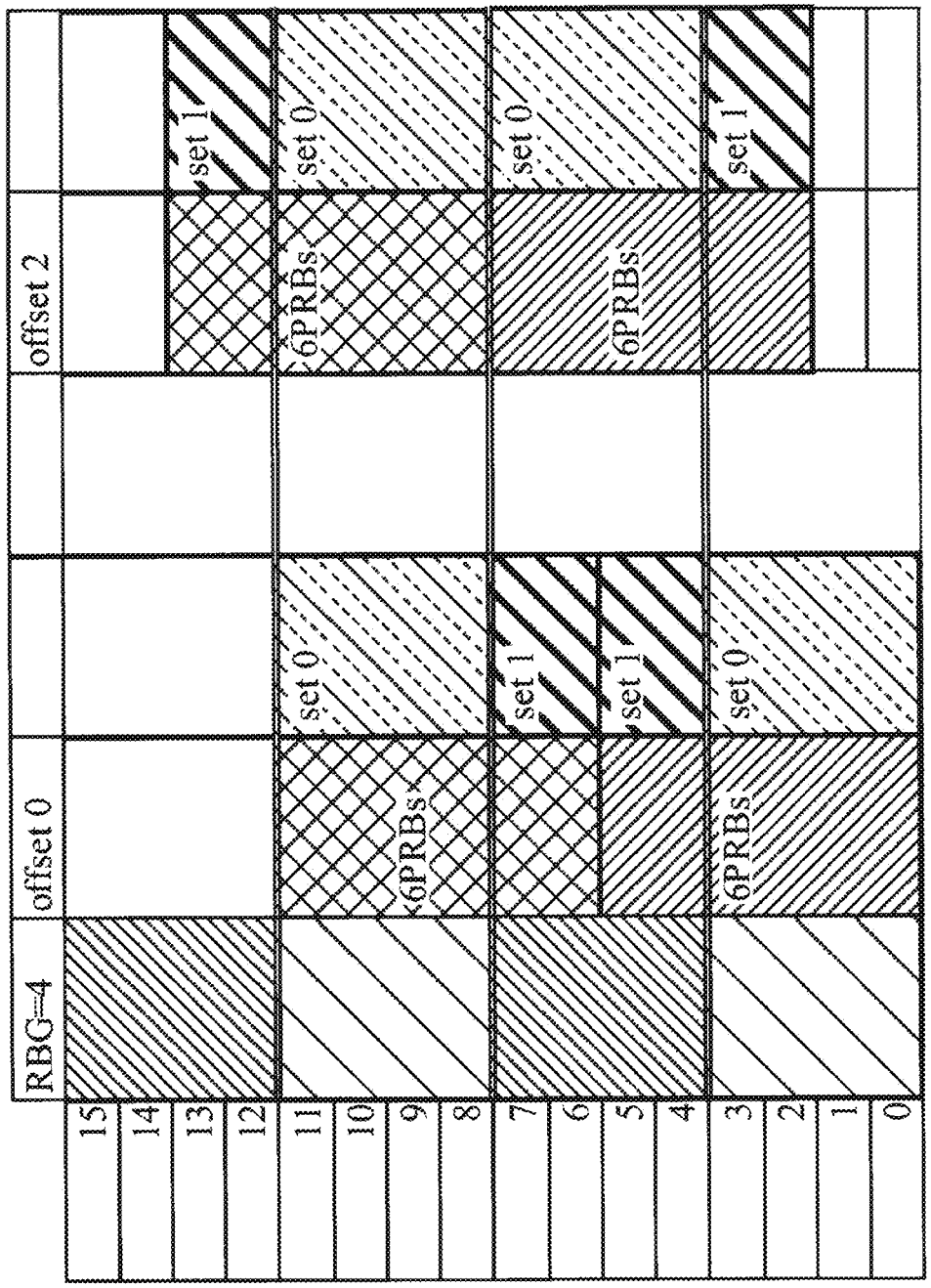
FIG. 10 is a diagram showing a method of allocation in the cases of offsets of 0 and 2.

In each of the cases of an offset of 1 and an offset of 2, the EPDCCH set 0 (four PRBs) is allocated to PRBs corresponding to an RBG having four PRBs included in the narrowband, and the EPDCCH set 1 (two PRBs) is allocated to PRBs corresponding to an RBG having two PRBs included in the narrowband. At an offset of 1 and an offset of 2, the allocation of the EPDCCHs is uniquely determined as shown in FIG. 10.

Figure 11:
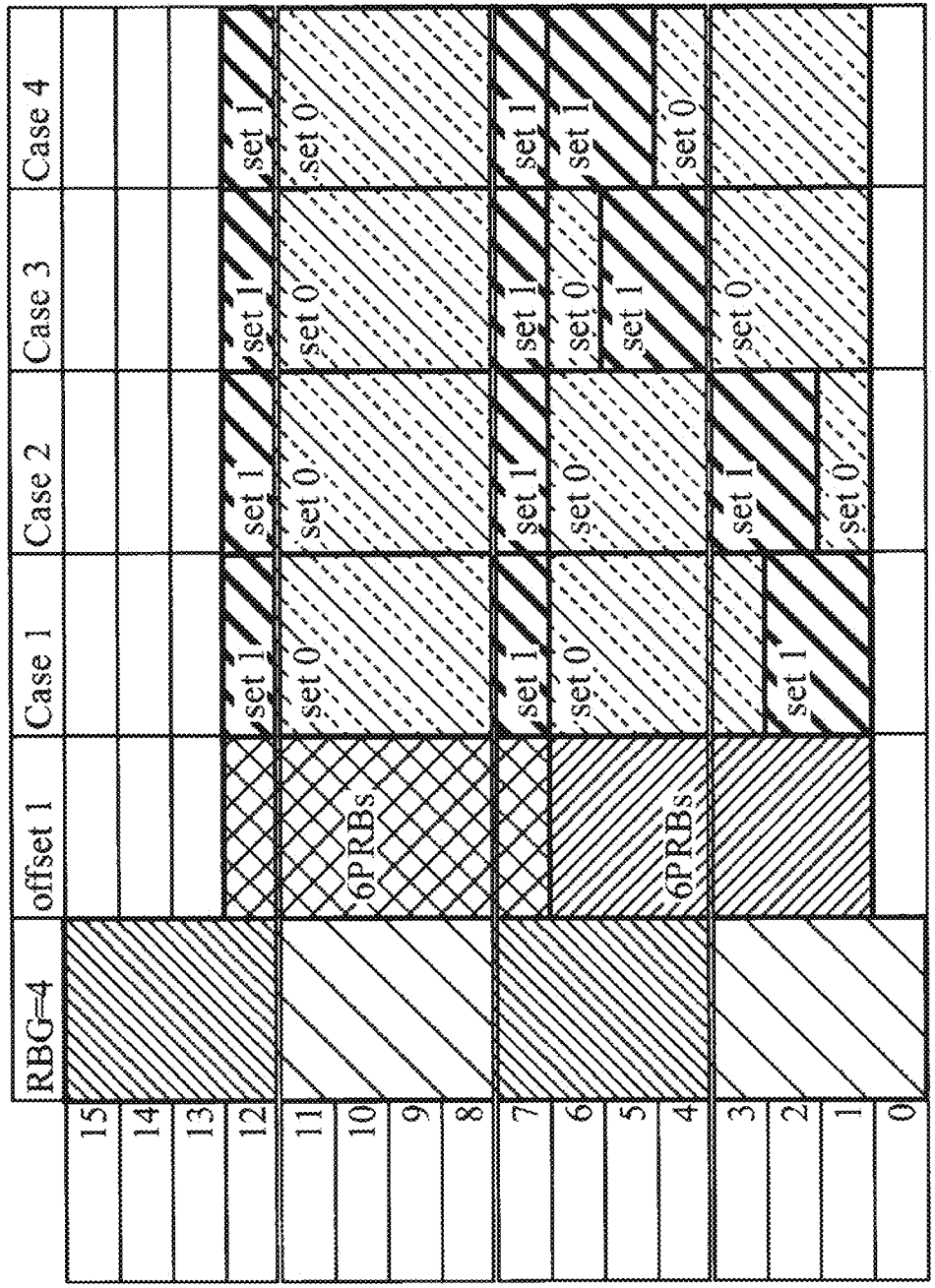
FIG. 11 is a diagram showing a method of allocation in the case of an offset of 1.
Figure 12:
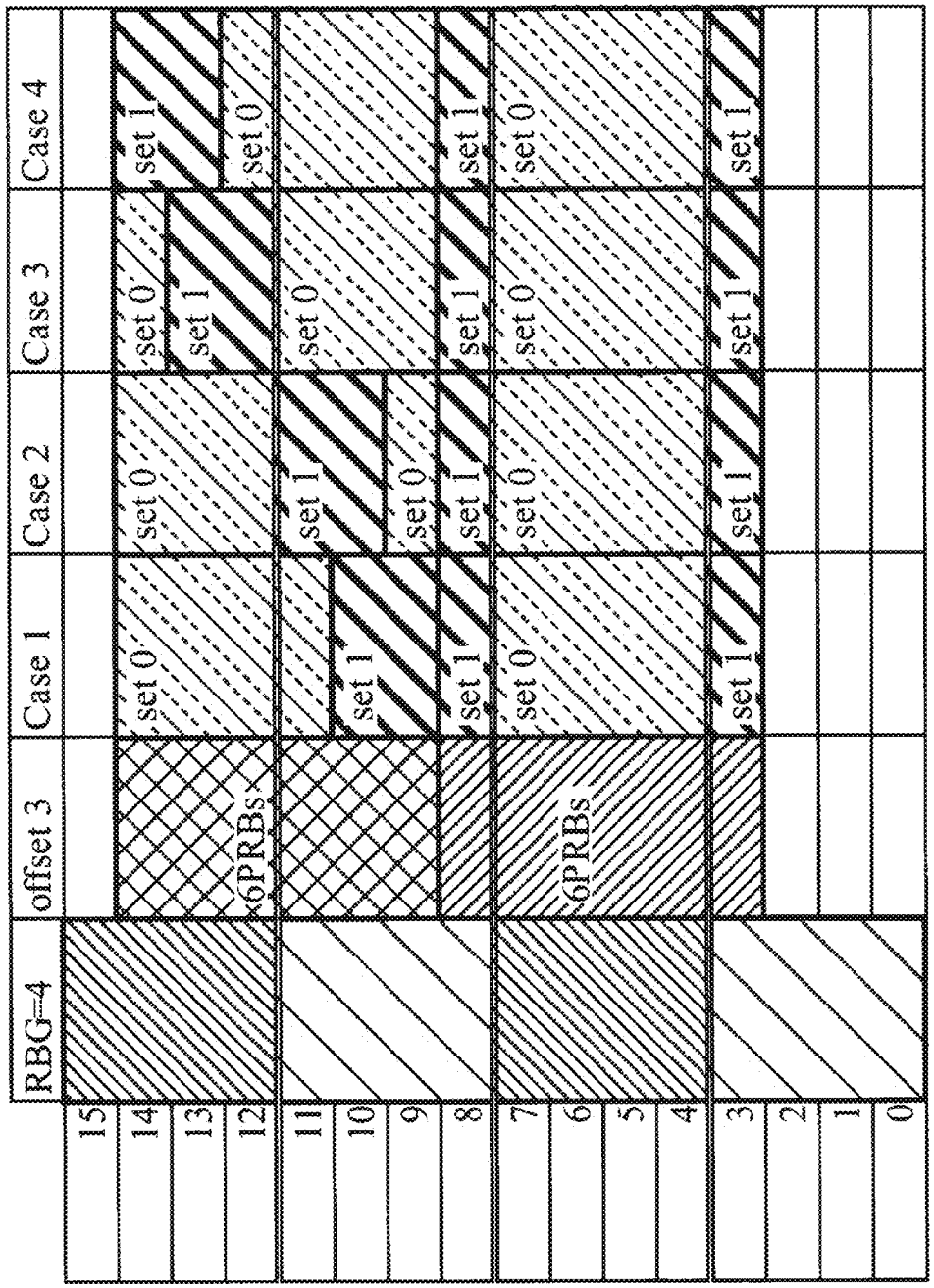
FIG. 12 is a diagram showing a method of allocation in the case of an offset of 3.

In each of the cases of an offset 1 and an offset 3, the allocation of the EPDCCHs varies between a case where one narrowband includes two RBGs and a case where one narrowband includes three RBGs. In a case where one narrowband includes two RBGs, the number of PRBs that are included in each of the RBGs is 3. Accordingly, the EPDCCH set 1 (two PRBs) is allocated to two PRBs of one RBG, and the EPDCCH set 0 (four PRBs) is allocated to the remaining one PRB and the three PRBs of the other RBG. As shown in FIGS. 11 and 12, there are four possible cases of allocation methods. This allocation allows the EPDCCH set 1 (two PRBs) to be allocated to one RBG. Further, in a case where one narrowband includes three RBGs, the EPDCCH set 0 (four PRBs) is allocated to PRBs corresponding to an RBG including four PRBs located in the center of the narrowband, and the EPDCCH set 1 (two PRBs) is allocated to two RBGs each including one PRB located at either end of the narrowband. This allows the EPDCCH set 0 (four PRBs) to be allocated to one RBG.

Thus, in each of the cases of an offset of 1 and an offset of 3, the variations in the allocation of the EPDCCH sets from narrowband to narrowband in the positional relationship between narrowbands and RBGs make it possible to reduce the number of RBGs to which one EPDCCH set is allocated within each narrowband. This allows RBGs that are not used for EPDCCHs to be assigned to data signals for other terminals and MTC terminals.

In the case of an RBG size of 4, Embodiment 1 eliminates the need to notify the setting of an MPDCCH for each correspondence relationship, although each narrowband has a different correspondence relationship with RBGs.

Case Where There Are a Plurality of Cases for One Offset

In a case where there are a plurality of cases of positional relationships between narrowbands and RBGs for one offset, a base station and an MTC terminal share it in common in advance which case to use, or the base station may notify the MTC terminal which case to use. In a case where the base station and the MTC terminal share it in common which case to use, the same cases, such as Case 1 at an offset of 1 and Case 1 at an offset of 1, or different cases, such as Case 1 at an offset of 1 and Case 2 at an offset of 1, may be set at an RBG size of 2. The same cases at an RBG size of 2 have a cyclically-shifted relationship between an offset of 0 and an offset of 1. The EPDCCH set assigned to PRB #0 at an offset of 0 is assigned to PRB #6 at an offset of 1, and the EPDCCH set assigned to PRBs #1 to 5 at an offset of 0 is assigned the same EPDCCH set at an offset of 1.

Configuration of Base Station

Figure 13:
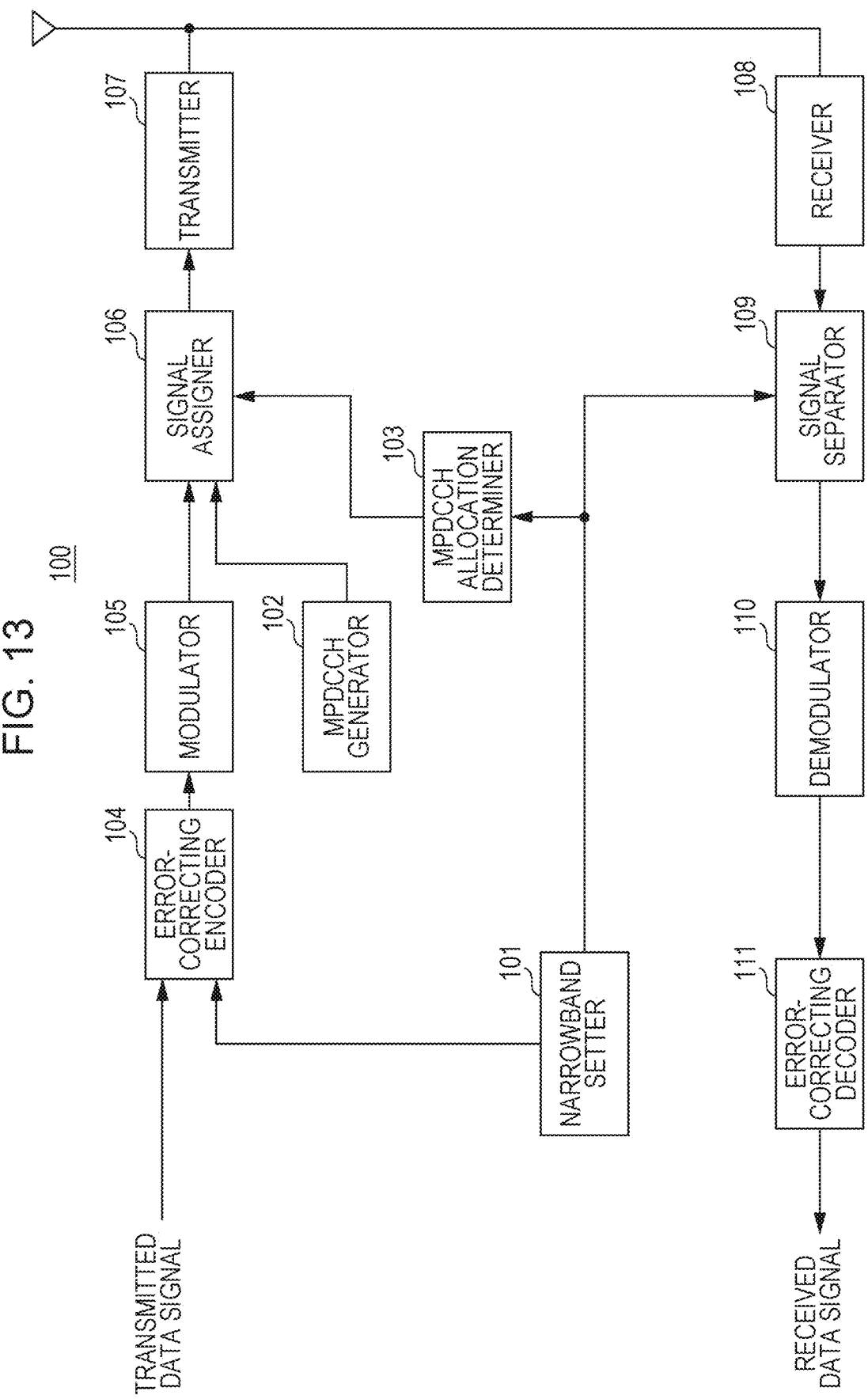
FIG. 13 is a block diagram showing a configuration of a base station according to an embodiment.

FIG. 13 is a block diagram showing a configuration of a base station 100 according to Embodiment 1. As shown in FIG. 13, the base station 100 includes a narrowband setter 101, an MPDCCH generator 102, an MPDCCH allocation determiner 103, an error-correcting encoder 104, a modulator 105, a signal assigner 106, a transmitter 107, a receiver 108, a signal separator 109, a demodulator 110, and an error-correcting decoder 111.

The narrowband setter 101 determines the settings of narrowbands, i.e. an offset, in accordance with information such as the number of users held by another base station (not illustrated), the required amount of PUCCH resource, and the line quality of an MTC terminal. This offset determines a relationship between RBGs and narrowbands. For notification of the settings of narrowbands by higher-layer signaling, the amount of offset set by the narrowband setter 101 is outputted to the error-correcting encoder 104. Further, the amount of offset is also outputted to the MPDCCH allocation determiner 103 and the signal separator 109.

The MPDCCH allocation determiner 103 determines the allocation of an EPDCCH set 0 and an EPDCCH set 1 from the amount of narrowband offset that is inputted from the narrowband setter 101 and an RBG size that is determined from the bandwidth (not illustrated). Standards for allocation methods are held in common in the base station and the MTC terminal in advance, and allocation is performed so that the EPDCCH set 0 or the EPDCCH set 1 is allocated to a minimum number of RBGs. The allocation of an MPDCCH thus determined is outputted to the signal assigner 106.

The MPDCCH generator 102 generates an MPDCCH that is control information addressed to the MTC terminal, generates a signal that is transmitted to either of both of the EPDCCH set 0 and the EPDCCH set 1, and outputs the signal to the signal assigner 106.

The error-correcting encoder 104 receives a transmitted data signal (DL data signal) and the higher-layer signaling sent from the narrowband setter 101, error-correcting encodes the signals thus received, and outputs the resulting signals to the modulator 105. The modulator 105 performs a modulation process on the signals received from the error-correcting encoder 104 and outputs the signals thus modulated to the signal assigner 106.

The signal assigner 106 assigns the transmitted data signal, the higher-layer signaling, and the MPDCCH, which is a control signal. The MPDCCH is assigned on the basis of the allocation of the EPDCCH set 0 and the EPDCCH set 1 in the narrowband as inputted from the MPDCCH allocation determiner 103. As for the transmitted data signal and the higher-layer signaling, too, signals intended for the MTC terminal are assigned to the narrowband. To the resources to which the MPDCCH was not allocated, the transmitted data signal and the higher-layer signaling can be assigned. A transmitted signal is formed by thus assigning the control signal and the data signal to predetermined resources. The transmitted signal thus formed is outputted to the transmitter 107.

The transmitter performs a radio transmission process such as up-conversion on the input signal and transmits the resulting signal to the terminal 200 via an antenna.

The receiver 108 receives via the antenna a signal transmitted from the terminal 200 and outputs the signal to the signal separator 109. The signal separator 109 separates the received signal on the basis of information that is inputted from the narrowband setter 101 and outputs the resulting signal to the demodulator 110. The demodulator 110 performs a demodulation process on the input signal and outputs the resulting signal to the error-correcting decoder 111. The error-correcting decoder 111 decodes the input signal and obtains the received data signal from the terminal 200.

Configuration of MTC Terminal

Figure 14:
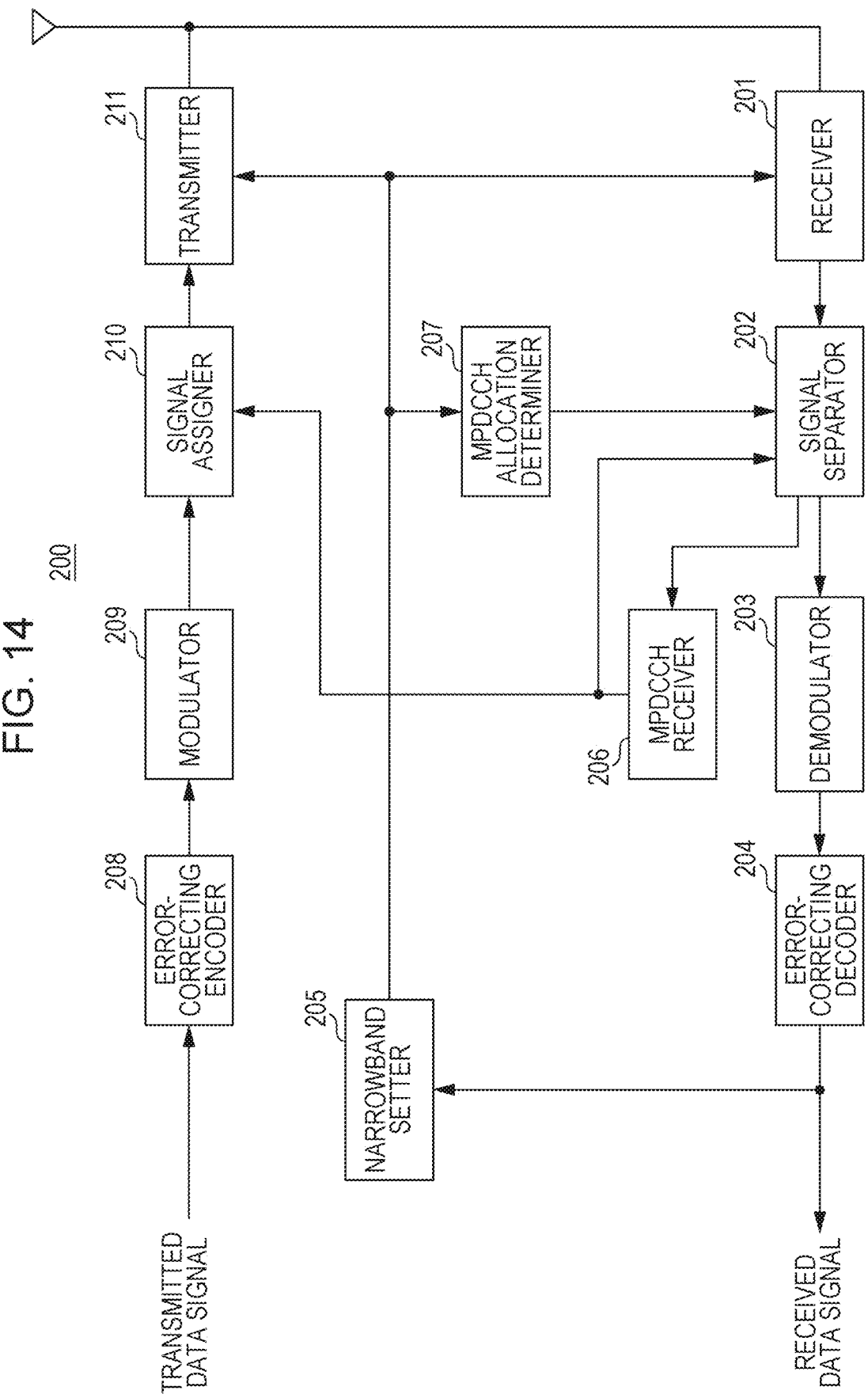
FIG. 14 is a block diagram showing a configuration of a terminal according to an embodiment.

FIG. 14 is a block diagram showing a configuration of an MTC terminal 200 according to Embodiment 1. As shown in FIG. 14, the terminal 200 includes a receiver 201, a signal separator 202, a demodulator 203, an error-correcting decoder 204, a narrowband setter 205, an MPDCCH receiver 206, an MPDCCH allocation determiner 207, an error-correcting encoder 208, a modulator 209, a signal assigner 210, and a transmitter 211.

The receiver 201 identifies, on the basis of the definition of a narrowband as received from the narrowband setter 205 and a predetermined pattern, which narrowband a signal is assigned to, and retunes to the narrowband. The receiver 201 receives a received signal via an antenna, performs a reception process such as down-conversion on the received signal, and then outputs the resulting signal to the signal separator 202.

The signal separator 202 separates an MPDCCH signal on the basis of an EPDCCH set 0 and an EPDCCH set that are inputted from the MPDCCH allocation determiner 207 and outputs the MPDCCH signal to the MPDCCH receiver 206. Further, on the basis of DL assignment information that is inputted from the MPDCCH receiver 206, a DL data signal and higher-layer signaling are outputted to the demodulator 203.

The demodulator 203 demodulates the received signal and outputs the signal thus demodulated to the error-correcting decoder 204.

The error-correcting decoder 204 decodes the demodulated signal outputted from the demodulator 203 and outputs the resulting received data signal. Further, the error-correcting decoder 204 outputs, to the narrowband setter 205, narrowband offset information obtained as the higher-layer signaling.

The narrowband setter 205 sets a definition of a narrowband on the basis of the bandwidth and the narrowband offset information. The definition of a narrowband is outputted to the MPDCCH allocation determiner 207, the transmitter 211, and the receiver 201.

The MPDCCH allocation determiner 207 determines the allocation of the EPDCCH set 0 and the EPDCCH set 1 from the amount of narrowband offset that is inputted from the narrowband setter 205 and an RBG size that is determined from the bandwidth (not illustrated). Standards for allocation methods are held in common in the base station and the MTC terminal in advance, and allocation is performed so that the EPDCCH set 0 or the EPDCCH set 1 is allocated to a minimum number of RBGs. The allocation of an MPDCCH thus determined is outputted to the signal assigner 202.

The MPDCCH receiver 206 receives the MPDCCH signal from the signal separator 202, blind decodes the MPDCCH with respect to a search space for the EPDCCH set 0 and a search space for the EPDCCH set 1 or a combination of thereof, and detects an MPDCCH that is a control signal containing DL signal assignment information or UL signal assignment information.

The error-correcting encoder 208 receives a transmitted data signal (UL data signal), error-correcting encodes the transmitted data signal, and outputs the resulting signal to the modulator 209. The modulator 209 modulates the signal from the error-correcting encoder 208 and outputs the modulated signal to the signal assigner 210.

The signal assigner 210 assigns the transmitted signal thus inputted on the basis of UL assignment information that the signal assigner 210 receives from the MPDCCH receiver 206, and outputs the resulting signal to the transmitter 211.

The transmitter 211 identifies, on the basis of the definition of a narrowband as inputted from the narrowband setter 205 and a predetermined pattern, a narrowband resource to which UL data is assigned, performs retuning, performs a transmission process such as up-conversion on the input signal, and transmits the resulting signal.

Other Embodiments

It should be noted that although Embodiment 1 described above has shown a case where one narrowband includes six PRBs, it is also applicable to a case where one narrowband includes five PRBs and an EPDCCH set of three PRBs and an EPDCCH set of two PRBs are allocated.

In this case, at an RBG size of 2, the EPDCCH set of two PRBs is assigned to an RBG having two PRBs included in the narrowband, and the EPDCCH set of three PRBs is assigned to the remaining PRBs.

At an RBG size of 3, the EPDCCH set of three PRBs is assigned to an RBG having three PRBs included in the narrowband, and the EPDCCH set of two PRBs is assigned to the remaining PRBs.

At an RBG size of 4, the EPDCCH set of two PRBs is assigned to an RBG having two PRBs included in the narrowband, if any, and the EPDCCH set of three PRBs is assigned to an RBG having three PRBs included in the narrowband, if any.

It should be noted that the allocation of an MPDCCH may be changed in a case where there is overlap between PRBs to which PSS/SSS/PBCH is allocated and a narrowband near the center frequency. In the presence of PRBs overlapping PSS/SSS/PBCH and PRBs not overlapping PSS/SSS/PBCH, the EPDCCH set 0 (four PRBs) is allocated to the non-overlapping PRBs in a case where the non-overlapping PRBs are four or more PRBs, and the EPDCCH set 1 (two PRBs) is allocated to the non-overlapping PRBs in a case where the non-overlapping PRBs are three or more PRBs or two or less PRBs.

Embodiment 2

Embodiment 2 presents the assignment of an MPDCCH by higher-layer signaling (RRC signaling). The base station notifies, by RRC signaling, information as to which PRBs within a narrowband the EPDCCH set 0 and the EPDCCH set 1 are assigned to. In so doing, the assignment method of Embodiment 1 is included in parameters that are notified by signaling. Since the base station can select an MPDCCH allocation method from among a plurality of allocation methods, flexibility of MPDCCH allocation is improved. Since the parameters that are notified by signaling include the assignment method of Embodiment 1, it is not necessary to notify fine settings of MPDCCHs according to offsets that vary from base station to base station. Further, particularly in the case of an RBG size of 4, it is not necessary to notify the setting of an MPDCCH for each correspondence relationship, although each narrowband has a different correspondence relationship with RBGs.

Example Operation: 1 Bit Per Band

Figure 15:
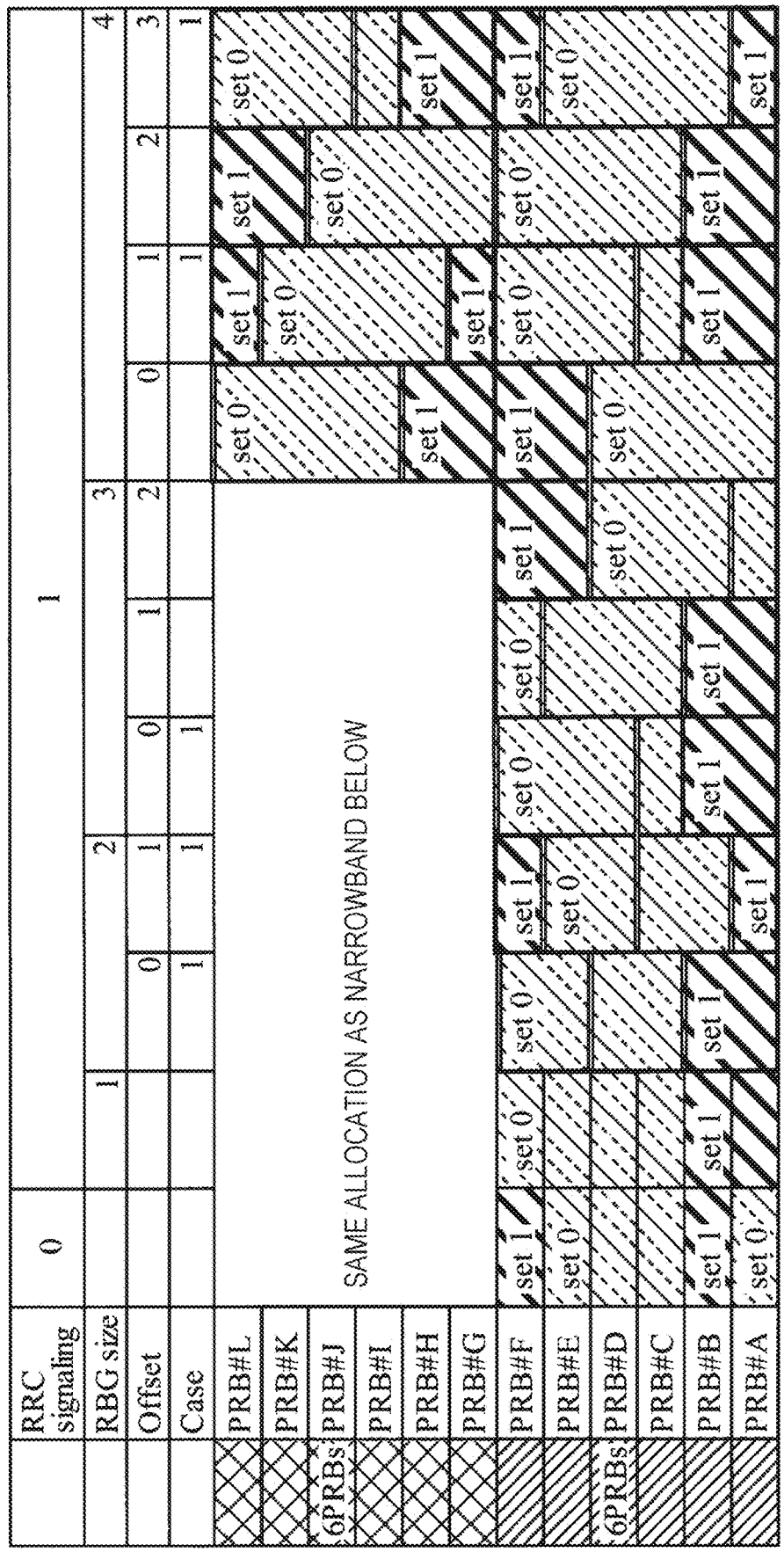
FIG. 15 is a diagram showing an example of allocation in a case where MPDCCHs within a narrowband are assigned by 1 bit of RRC signaling per band.

FIG. 15 shows an example in which in a case where an MPDCCH within a narrowband is assigned by 1 bit of RRC signaling per band, bit 0 represents a predetermined allocation and bit 1 represents an allocation that is determined by the size and offset of Embodiment 1. In the present example, Case 1 represents all cases where there are a plurality of cases for the same offset.

The base station selects either the assignment based on Embodiment 1 by RRC signaling, i.e. the assignment in which an EPDCCH set is allocated to fewer RBGs, or another assignment, e.g. an assignment such as that represented by RRC signaling bit 0 of FIG. 15, and notifies the MTC terminal.

In the case of bit 0, the MTC terminal thus notified recognizes the allocation as predetermined, and in the case of bit 1, the MTC terminal thus notified recognizes the allocation of an MPDCCH from the number of RBGs and the offset. In particular, in the case of an RBG size of 4, because of a positional relationship between narrowbands and RBGs, there are two types of MPDCCH allocation pattern even with the same offset.

In the allocation represented by bit 0 of RRC signaling of FIG. 15, there are five PRBs from end to end of the allocation of PRBs of the EPDCCH set 0 and the EPDCCH set 1. This assignment of the EPDCCH set 0 and the EPDCCH set 1 brings about a frequency diversity effect. Therefore, in a case where there is emphasis on the frequency diversity effect, the base station notifies bit 0 by RRC signaling, and in a case where there is emphasis on an RBG-by-RBG assignment, the base station notifies bit 1. This makes flexible settings possible.

In a case where an MPDCCH within a narrowband is assigned by 2 bits of RRC signaling per band, bits 00, 01, and 10 represent predetermined allocations and bits 11 represents an allocation that is determined by the size and offset of Embodiment 1. FIG. 16 shows an example. In the present example, Case 2 represents all cases where there are a plurality of cases for the same offset. Of these allocations, the allocation that is notified by bits 00 and the allocation that is determined by an RBG size of 3 and an offset of 1 are the same. Regardless of which bits the MTC terminal is assigned by, the MTC terminal recognizes these allocations as being the same. Further, the allocation that corresponds to bits 01 is the same as the allocation that corresponds to bit 0 of FIG. 15, bringing about a high frequency diversity effect.

Embodiment 3

Presupposition

In MTC, it has been under consideration that repetition of a signal is performed for cell coverage enhancement. By the base station repeatedly transmitting the same signal over a plurality of subframes, the MTC terminal improves reception quality by combining the plurality of signals. Furthermore, it has also been under consideration that frequency hopping is applied to give frequency diversity gain by changing the frequency position of a narrowband that is used for transmission and reception every constant period. Further, the base station and the terminal share a plurality of patterns of hopping in advance and determine in advance, for each hopping pattern, which narrowband to hop to. In this case, DCI (downlink control information) that is transmitted through an MPDCCH notifies which frequency hopping pattern to assign.

Further, in the case of an RBG size of 4, as shown in FIG. 9, the allocation of RBGs that are included in a narrowband varies from narrowband to narrowband, even if the offset of the narrowband is determined. In each of the cases of an offset of 0 and an offset of 2, one narrowband includes two RBGs, one of which includes four PRBs and the other of which includes two PRBs. A case (Type B) where an RBG of four PRBs is placed at an upper end of the narrowband and a case (Type A) where an RBG of four PRBs is placed at a lower end of the narrowband alternate on the frequency axis.

Problems and Measures

Figure 17:
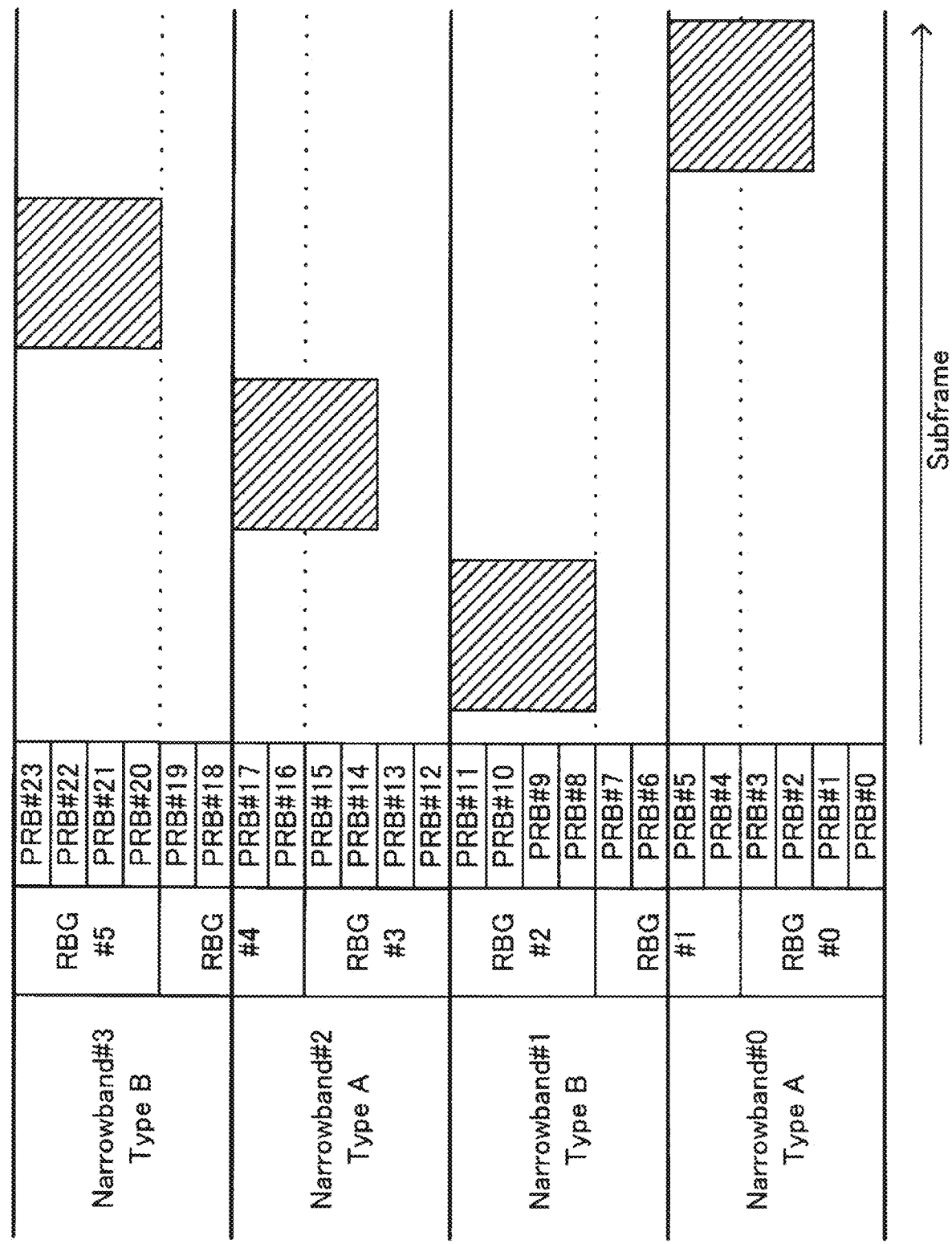
FIG. 17 is a diagram showing an example of resource assignment in a case where repetition entailing frequency hopping is applied.

At an RBG size of 4, the application of repetition entailing frequency hopping causes a PDSCH to be assigned over narrowbands differing in the allocation of RBGs within the narrowbands. However, for DCI that is transmitted through an MPDCCH, it is considered that resources are assigned en block during the repetition. FIG. 17 shows an example of assignment. In this example, a PDSCH is assigned with reference to Narrowband #1. Narrowband #1 is a Type B narrowband. The PDSCH is assigned to the same PRB #8 to #11 as RBG #2. When frequency hopping makes the transition to Narrowband #2, which is a Type A narrowband, the PDSCH comes to be assigned to PRB #14 to #17 over two RBGs, namely RBG #3 and RBG #4, although the assignment whiten the narrowband remains the same. Thus, with an RBG size of 4, the repeated PDSCH may occupy unnecessarily many RBGs, as the allocation of RBGs that are included in a narrowband varies from narrowband to narrowband.

To address this problem, Embodiment 3 presents the assignment of DL data (PDSCH) for an MTC terminal in the case of an RBG size of 4. In the case of an RBG size of 4, a PDSCH for an MTC terminal that is assigned by an MPDCCH is assigned to different resources, depending on narrowbands and RBG allocations. This makes it possible to restrict the number of RBGs to which the PDSCH for the MTC terminal is allocated, even with the transition of narrowbands in the case of the assignment of the PDSCH on an RBG-by-RBG basis, thus making it easy to assign a PDSCH for another terminal and other signals to RBGs.

Example Operation

Figure 18:
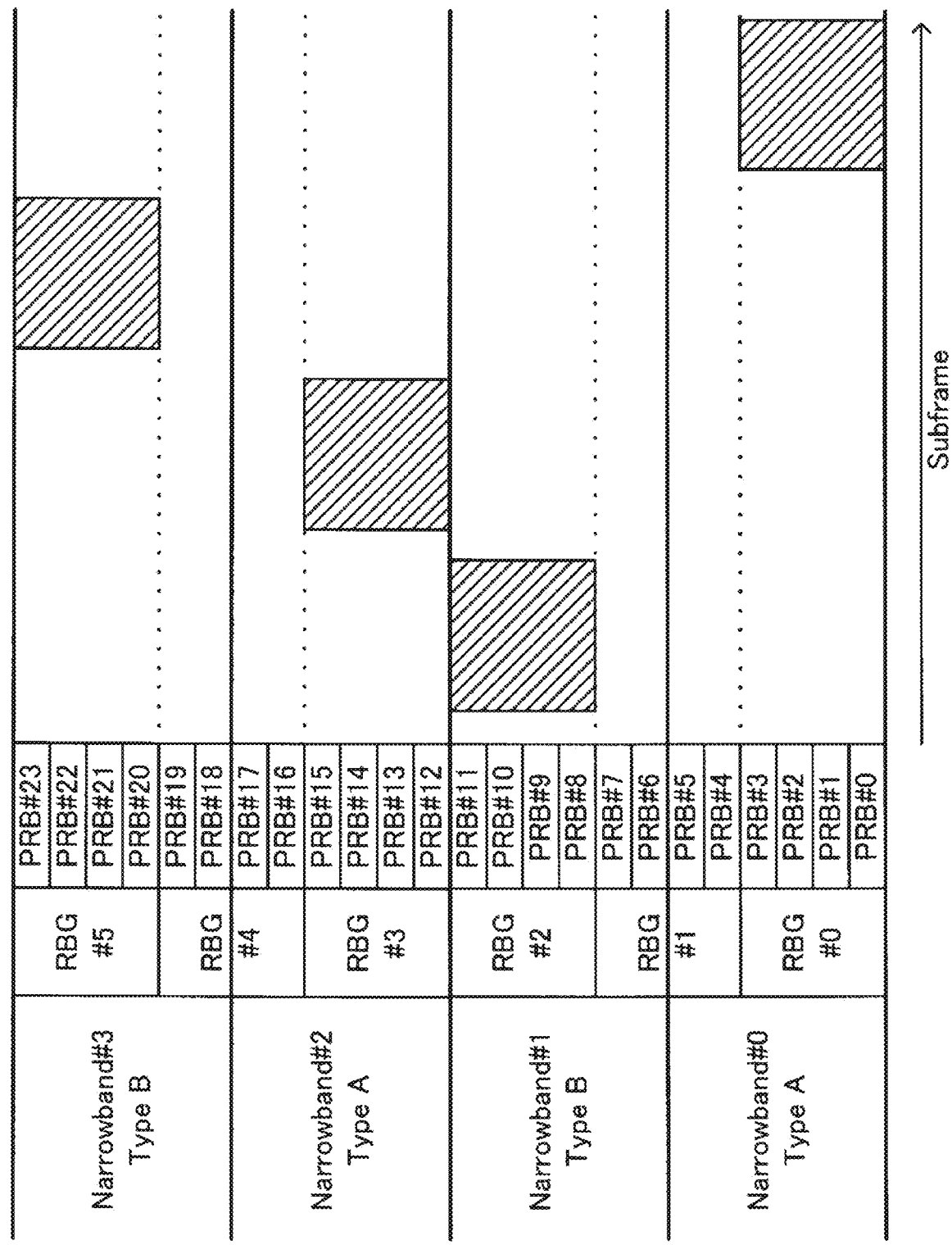
FIG. 18 is a diagram showing an example operation of changing, according to whether a PDSCH is assigned to a Type A or Type B narrowband, the allocation of PRBs to which the PDSCH is assigned within the narrowband.

An example is shown in which a PDSCH is assigned with an RBG size of 4. The allocation of PRBs to which the PDSCH is assigned within a narrowband is changed according to whether the PDSCH is assigned to a Type A or Type B narrowband. FIG. 18 shows an example operation. In this example, the PDSCH is assigned with reference to Narrowband #1, which is a Type B narrowband. The PDSCH is assigned to the same PRB #8 to #11 as RBG #2. When frequency hopping makes the transition to a Type A narrowband, the PDSCH is assigned to the same PRB #12 to 15 as RBG #3. This causes the PDSCH to occupy only one RBG in Narrowband #2, too.

There are two methods for achieving the present example operation. The first method is mirroring, and the second method is a cyclic shift. The two methods are described by taking, as an example, a case where PRBs within a narrowband are assigned by a bitmap with RIVs (resource indication values) of 0 to 63, assuming that DCI to which PRBs within a narrowband are assigned contains 6 bits of RIV. In a bitmap of bits, PRBs within a narrowband are associated in ascending order of PRB number, starting from the lower bit of binary notation of RIV. An RIV of 22 is denoted by bits of 010110 and, in a case where the VRBs (virtual resource blocks) within a narrowband are VRB #0 to #5, indicates that resources are assigned to VRB #4, VRB #2, and VRB #1. Note here that a VRB indicates an RB that is used to determine an assignment within a narrowband prior to the assignment of resources to PRBs.

Figure 19:
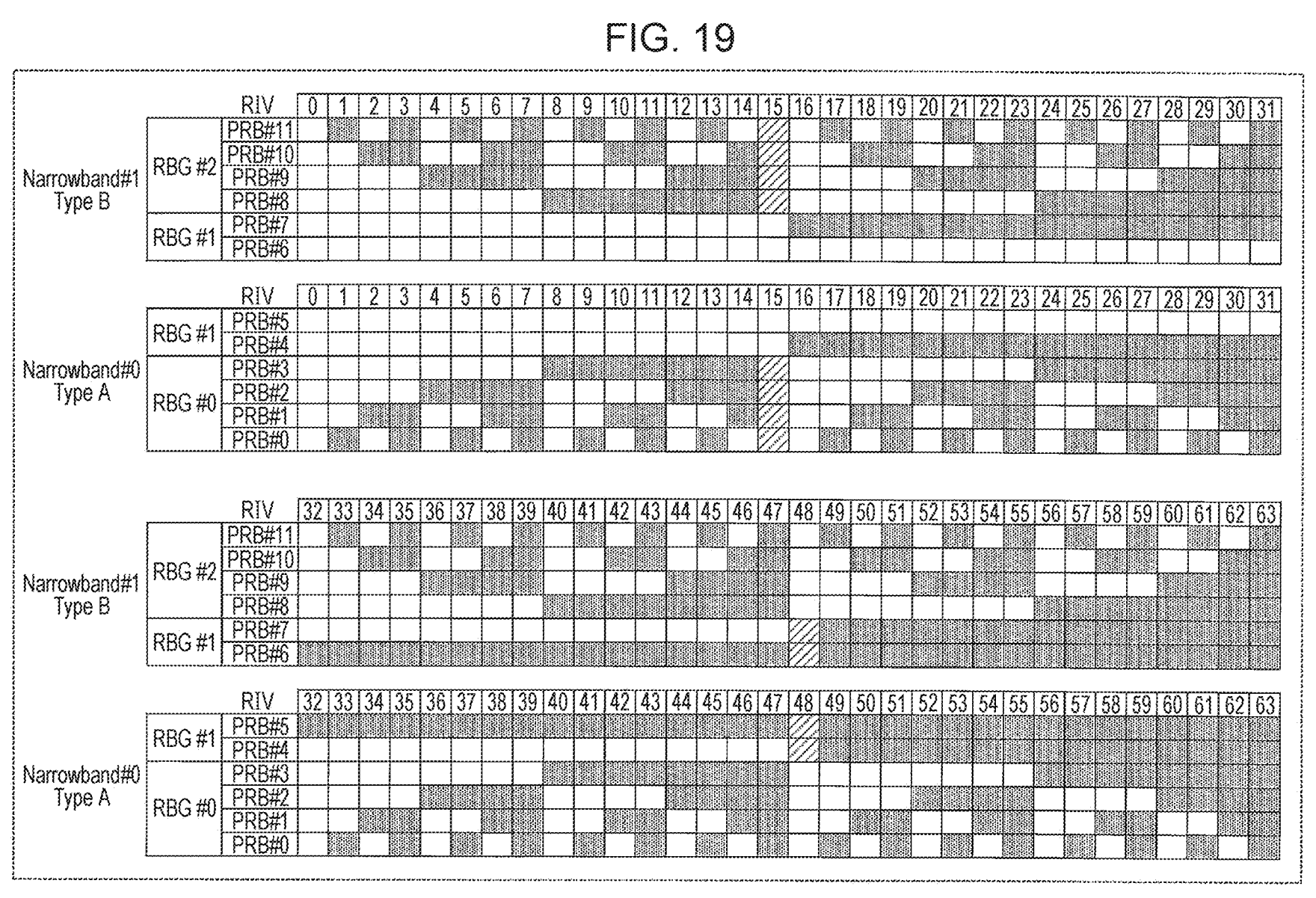

In mirroring, as shown in FIG. 19, the assignment of Type B is obtained by inverting the assignment of resources and the allocation of PRBs in a frequency direction with reference to the assignment of Narrowband Type A. The terminal is notified of RIVs that indicate different resources within the narrowband, depending on whether the resource assigned to the terminal is a Type A or Type B narrowband. In the present example, VRBs are assigned by RIVs of 6 bits of bitmap and mapped onto PRBs for each type of narrowband and for each narrowband. The mapping from VRB to PRB is calculated according to equation (1) below. Note here that Y denotes the assigned VRB number, X denotes the smallest PRB number within the narrowband, and Z denotes the PRB number that is assigned.

$$\text{(Type A) } Z = X + Y \qquad (1)$$
$$\text{(Type B) } Z = X + 5 - Y$$

According to equation (1) above, as shown in FIG. 19, since the smallest PRB # within Narrowband #0 Type A is PRB #0 (X=0) in a case where VRB #2 (Y=2) is assigned, the PRB that is assigned is PRB #2 (0+2=2), and since the smallest PRB # within Narrowband #1 Type B is PRB #6 (X=6) in a case where VRB #2 (Y=2) is assigned, the PRB that is assigned is PRB #9 (6+5−2=9).

Figure 20:
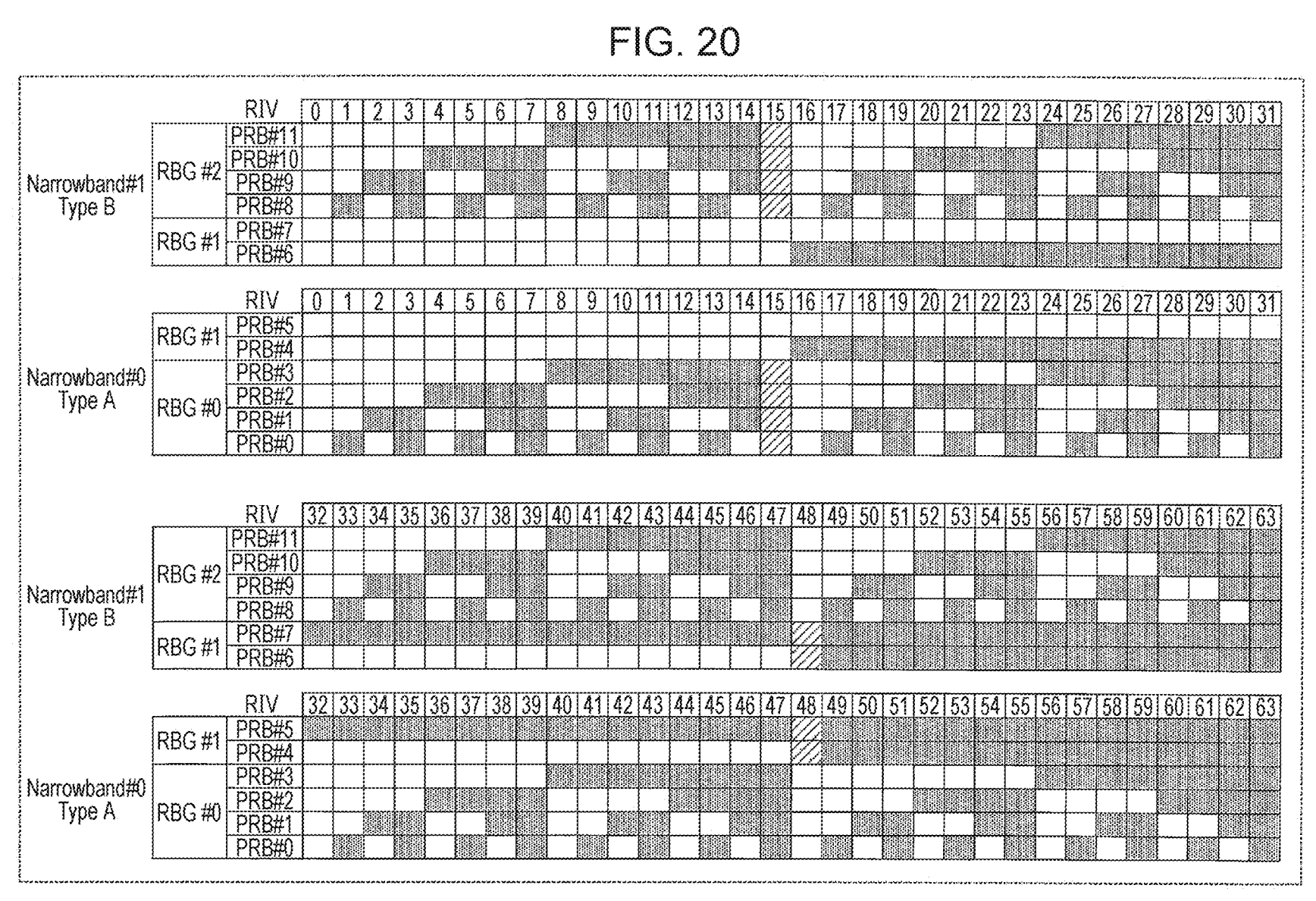

In a cyclic shift, as shown in FIG. 20, the assignment of Type B is obtained by cyclically shifting the assignment of resources and the allocation of PRBs by two PRBs with reference to the assignment of Narrowband Type A. The terminal is notified of RIVs that indicate different resources within the narrowband, depending on whether the resource assigned to the terminal is a Type A or Type B narrowband. In the present example, as in the case of mirroring, VRBs are assigned by RIVs of 6 bits of bitmap and mapped onto PRBs for each type of narrowband and for each narrowband. The mapping from VRB to PRB is calculated according to equation (2) below. Note here that Y denotes the assigned VRB number, X denotes the smallest PRB number within the narrowband, and Z denotes the PRB number that is assigned.

$$\text{(Type A) } Z = X + Y \qquad (2)$$
$$\text{(Type B) } Z = X + \mathrm{mod}(Y + 2, 6)$$

In Type A, the equation is the same as that of mirroring. In Type B, the shift amount is expressed by +2, and the cyclic shift operation within the narrowband is expressed by a modulo operation. As shown in FIG. 20, since the smallest PRB # within Narrowband #1 Type B is PRB #6 (X=6) in a case where VRB #2 (Y=2) is assigned, the PRB that is assigned is PRB #10 (6+mod (2+2, 6)=10).

Assigning resources within a narrowband in this manner achieves an RBG-by-RBG assignment even with the transition of narrowbands in a case where an PDSCH for an MTC terminal is assigned on an RBG-by-RBG basis as indicated by an RIV of 15, together with mirroring or a cyclic shift, thus making it easy to assign a PDSCH for another terminal and other signals to RBGs. Further, mirroring or a cyclic shift is not applied only to an RBG-by-RBG assignment, but a cyclic shift or a cyclic shift is applied to all resource assignments; therefore, in a case where an RIV of 15 and an RIV of 48 are simultaneously assigned to different MTC terminals, they can be simultaneously used even with the transition of narrowbands.

Further, in a cyclic shift, Type C and Type D may be defined in addition to Narrowband Type A and Type B. In each of the cases of an offset 1 and an offset of 3 shown in FIG. 9, there are a case (Type C) where one narrowband includes two RBGs each including three PRBs and a case (Type D) where one narrowband includes three RBGs, two of which each include one PRB and are placed at both ends, respectively, and the other of which includes four PRBs and is placed in the middle. Type C and Type D are alternately arranged on the frequency axis.

Figure 21:
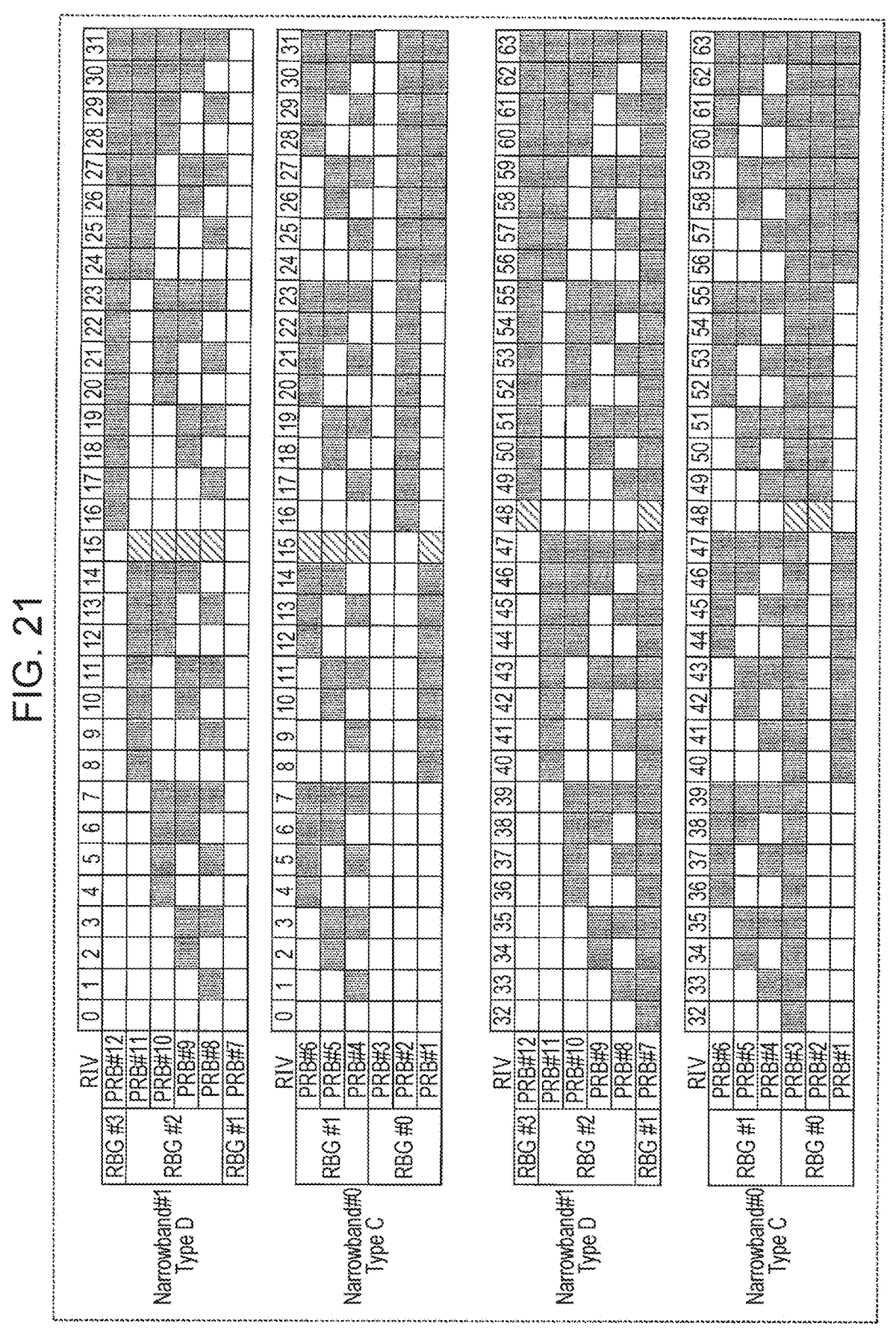

In FIG. 21, as in the case of Type A and Type B, the mapping from VRB to PRB is first calculated according to equation (3) below. Note here that Y denotes the assigned VRB number, X denotes the smallest PRB number within the narrowband, and Z denotes the PRB number that is assigned.

$$\text{(Type C) } Z = X + \mod(Y + 3, 6) \quad (3)$$
$$\text{(Type D) } Z = X + \mod(Y + 1, 6)$$

It should be noted that although FIGS. 19 to 21 have shown examples in which a PDSCH for an MTC terminal is assigned by 6 bits of bitmap, mirroring or a cyclic shift may be applied to another assignment method, e.g. DL Type 2 assignment, which applies continuous assignment to VRBs.

Configuration of Base Station

Figure 22:
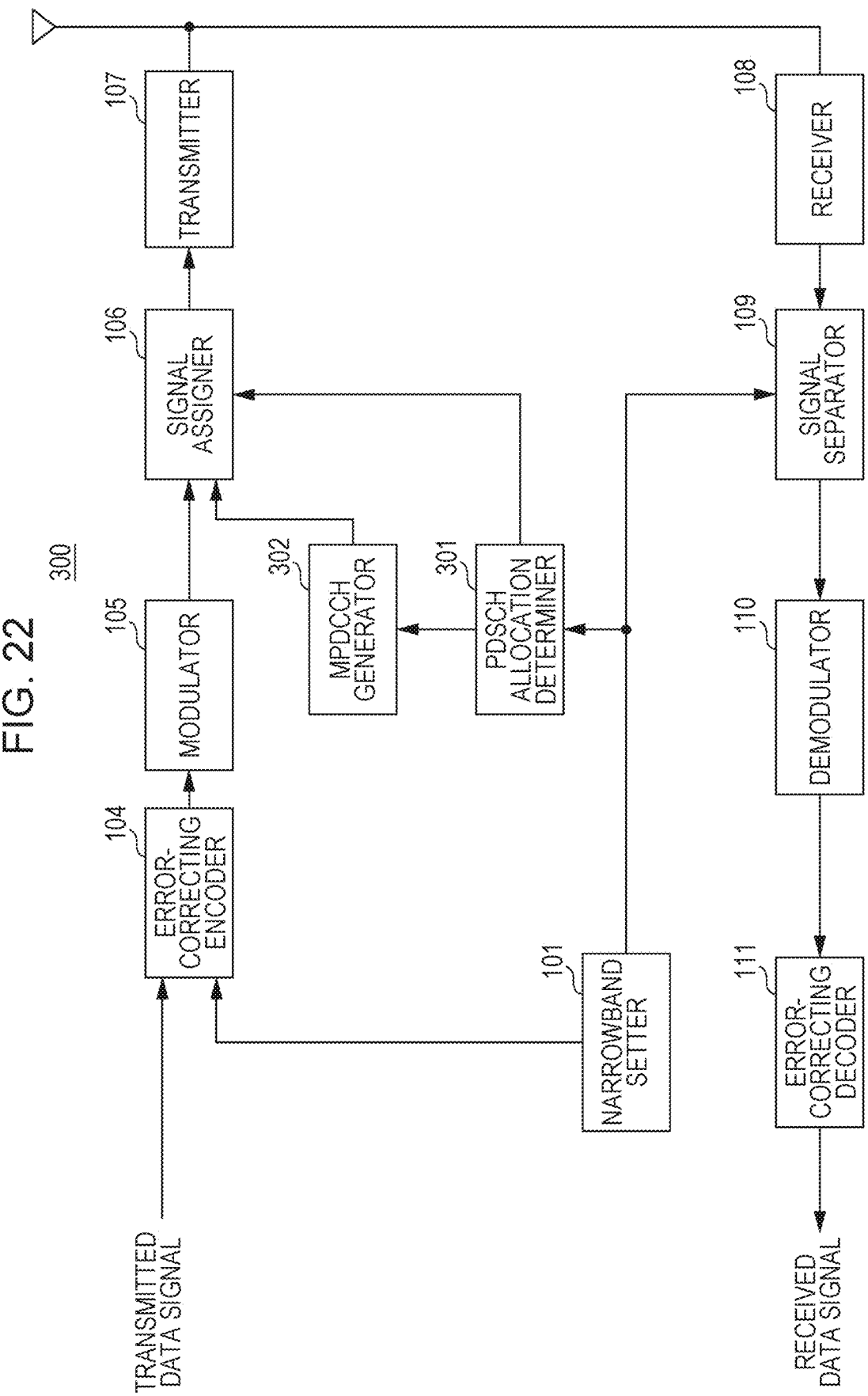
FIG. 22 is a block diagram showing a configuration of a base station according to Embodiment 3.

FIG. 22 is a block diagram showing a configuration of a base station 300 according to Embodiment 3. The base station 300 includes a narrowband setter 101, a PDSCH allocation determiner 301, an MPDCCH generator 302, an error-correcting encoder 104, a modulator 105, a signal assigner 106, a transmitter 107, a receiver 108, a signal separator 109, a demodulator 110, and an error-correcting decoder 111. FIG. 22 omits to illustrate the same components as those illustrated in FIG. 13.

The narrowband setter 101 determines the settings of narrowbands, i.e. an offset, in accordance with information such as the number of users held by another base station (not illustrated), the required amount of PUCCH resource, and the line quality of an MTC terminal. This offset determines a relationship between RBGs and narrowbands. For notification of the settings of narrowbands by higher-layer signaling, the amount of offset set by the narrowband setter 101 is outputted to the error-correcting encoder 104. Further, the amount of offset is also outputted to the MPDCCH allocation determiner 301 and the signal separator 109.

The PDSCH allocation determiner 301 determines, from the amount of narrowband offset that is inputted from the narrowband setter 101, an RBG size that is determined from the bandwidth (not illustrated), and a subframe number (not illustrated), the narrowband to which a DL data signal for the MTC terminal and the higher-layer signaling are assigned and resources within the narrowband. In the case of an RBG size of 4, the PDSCH allocation determiner 301 determines an assignment to VRBs within the narrowband, identifies the type of the narrowband, and determines, according to the type, resources to which a PDSCH is assigned. In a case where mirroring is applied, the assignment of Type B is obtained by inverting the assignment of resources and the allocation of PRBs in a frequency direction with reference to the assignment of Narrowband Type A. In a case where a cyclic shift is applied, the assignment of Type B is obtained by cyclically shifting the assignment of resources and the allocation of PRBs by two PRBs with reference to the assignment of Narrowband Type A. The allocation of the PDSCH thus determined is outputted to the signal assigner 106. The assignment to VRBs within the narrowband is outputted to the MPDCCH generator 302.

The MPDCCH generator 302 receives the PDSCH allocation information outputted from the PDSCH allocation determiner 301, generates an MPDCCH that is a control signal addressed to the MTC terminal, and outputs the MPDCCH to the signal assigner 106. The PDSCH allocation information is the assignment to VRBs prior to the application of mirroring or a cyclic shift.

The signal assigner 106 assigns, to resources, the DL data signal, which is assigned to the PDSCH, the higher-layer signaling, and the MPDCCH, which is a control signal. The assignment of the PDSCH for MTC is determined in accordance with the PDSCH allocation determiner 301. A transmitted signal is formed by thus assigning the control signal and the data signal to predetermined resources. The transmitted signal thus formed is outputted to the transmitter 107.

Configuration of MTC Terminal

Figure 23:
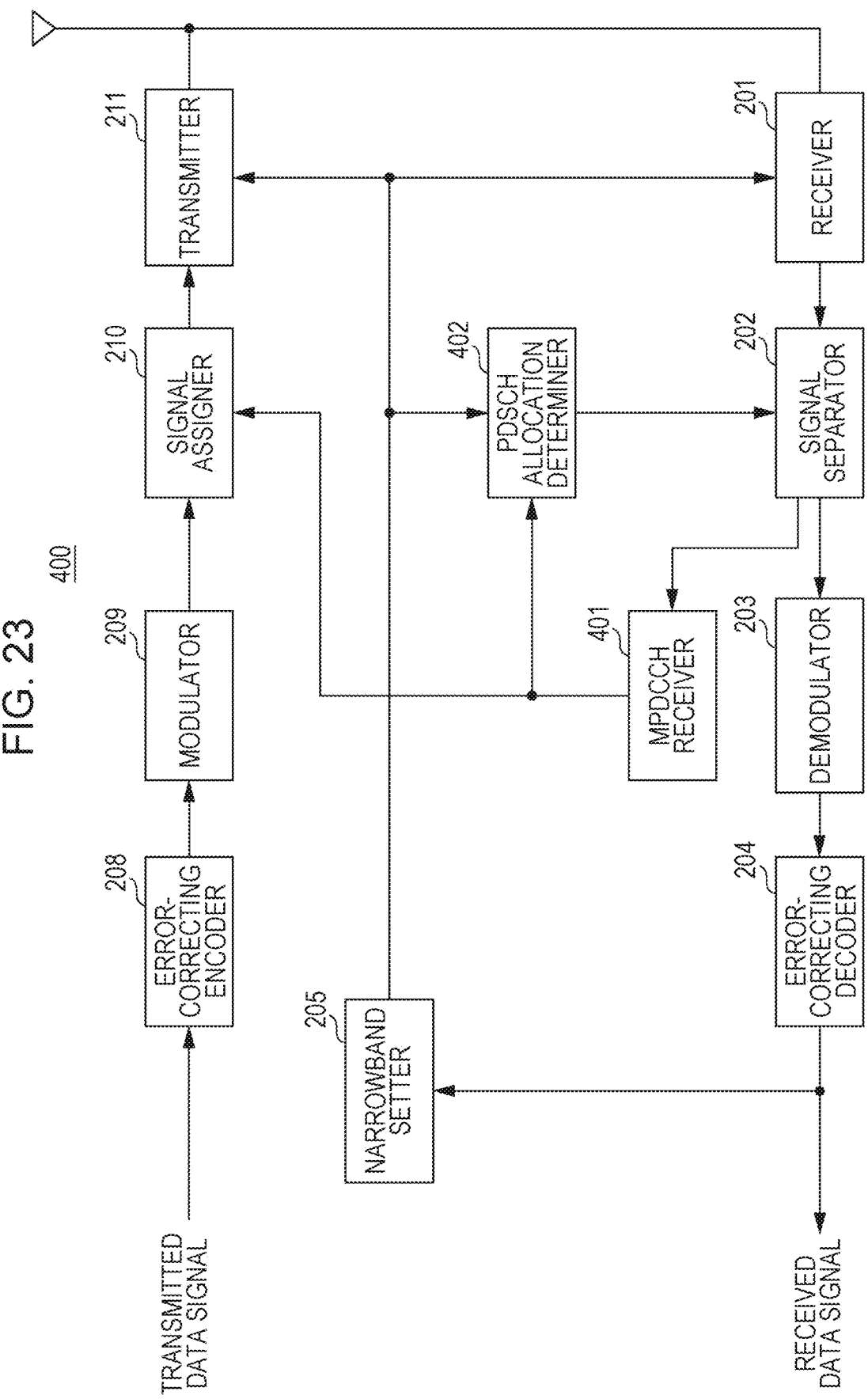
FIG. 23 is a block diagram showing a configuration of a terminal according to Embodiment 3.

FIG. 23 is a block diagram showing an MTC terminal 400 according to Embodiment 3. As shown in FIG. 23, the terminal 400 includes a receiver 201, a signal separator 202, a demodulator 203, an error-correcting decoder 204, a narrowband setter 205, an MPDCCH receiver 401, a PDSCH allocation determiner 402, an error-correcting encoder 208, a modulator 209, a signal assigner 210, and a transmitter 211. FIG. 23 omits to illustrate the same components as those illustrated in FIG. 14.

On the basis of PDSCH allocation information that is inputted from the PDSCH allocation determiner 402, the signal separator 202 outputs, to the demodulator 203, a DL signal data and higher-layer signaling that are allocated to a PDSCH. Further, the signal separator 202 separates an MPDCCH signal and outputs the MPDCCH signal to the MPDCCH receiver 401.

The narrowband setter 205 sets a definition of a narrowband on the basis of the bandwidth and the narrowband offset information. The narrowband setter 205 outputs the definition of a narrowband to the PDSCH allocation determiner 402, the transmitter 211, and the receiver 201.

In the case of an RBG size of 4, the PDSCH allocation determiner 402 identifies the type of the narrowband from the amount of narrowband offset that is inputted from the narrowband setter 205 and a subframe number (not illustrated). The PDSCH allocation determiner 402 identifies, from information on assignment to VRBs as inputted from the MPDCCH receiver 401 and the type of the narrowband, resources to which the PDSCH is assigned. In a case where mirroring is applied, the assignment of Type B is obtained by inverting the assignment of resources and the allocation of PRBs in a frequency direction with reference to the assignment of Narrowband Type A. In a case where a cyclic shift is applied, the assignment of Type B is obtained by cyclically shifting the assignment of resources and the allocation of PRBs by two PRBs with reference to the assignment of Narrowband Type A. The allocation of the PDSCH thus determined is outputted to the signal separator 202.

The MPDCCH receiver 401 blind decodes the MPDCCH signal that the MPDCCH receiver 401 received from the signal separator 202, and detects an MPDCCH that is a control signal containing DL signal assignment information or UL signal assignment information.

Other Embodiments

It should be noted that although Embodiment 2 described above has shown a case where 1 bit or 2 bits of RRC signaling per band is used to assign an MPDCCH within a narrowband, RRC signaling may be notified for each narrowband. In the case of notification for each narrowband, the required number of bits is the number of narrowbands multiplied by the number of notification bits for each narrowband. Configuring fine settings in this manner allows settings to vary from narrowband to narrowband.

Further, predetermined allocations may vary from bandwidth to bandwidth. This makes it easy to configure the settings so that there is no overlap between a predetermined allocation and an allocation that is determined by an offset.

Further, an aspect of the present disclosure is not limited to any of the embodiments described above but may be carried out in various modifications.

Further, while each embodiment has been described above by taking, as an example, a case where an aspect of the present disclosure is configured by hardware, the present disclosure can also be realized by software in cooperation with hardware.

Further, each functional block used in the description of each embodiment described above can be typically realized by an LSI such as an integrated circuit. Further, the integrated circuit may control each functional block used in the description of each embodiment described above and include an input and an output coupled thereto. These LSIs may be individually formed as one chip, or one chip may be formed so as to include a part or all of the functional blocks. The LSI here may be referred to as an IC (integrated circuit), a system LSI, a super LSI, or an ultra LSI depending on a difference in the degree of integration.

However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

A base station of the present disclosure includes: control circuitry that determines, based on an offset for defining a frequency position of a narrowband allocated to an MPDCCH and a resource block group (RBG) size of a system band, allocations of a first EPDCCH (enhanced physical downlink control channel) set and a second EPDCCH set that constitute the MPDCCH, the MPDCCH being a PDCCH (physical downlink control channel) for MTC (Machine-Type Communications), the second EPDCCH set having a different number of PRBs (physical resource blocks) from the first EPDCCH set; and a transmitter that transmits a control signal according to the allocations of the first EPDCCH set and the second EPDCCH set. In the base station, the control circuitry controls a number of RBGs in which both the first EPDCCH set and the second EPDCCH set are allocated to be zero or one.

In the base station of the present disclosure, when the RBG size is 2, the control circuitry allocates the MPDCCH to the first EPDCCH set and the second EPDCCH set, wherein the first EPDCCH set composed of two contiguous PRBs corresponds to one RBG in the narrowband and the second EPDCCH set composed of four PRBs corresponds to the remaining PRBs in the narrowband.

In the base station of the present disclosure, when the RBG size is 3, the control circuitry allocates the MPDCCH to the first EPDCCH set and the second EPDCCH set, wherein the first EPDCCH set composed of four contiguous PRBs corresponds to two RBGs in the narrowband and the second EPDCCH set composed of two PRBs corresponds to the remaining PRBs in the narrowband.

In the base station of the present disclosure, when the RBG size is 3, the control circuitry allocates the MPDCCH to the first EPDCCH set and the second EPDCCH set, wherein the first EPDCCH set composed of two PRBs corresponds to an RBG having two or more PRBs in the narrowband and the second EPDCCH set composed of four PRBs corresponds to the remaining PRBs in the narrowband.

In the base station of the present disclosure, when the RBG size is 4, the control circuitry allocates the MPDCCH to the first EPDCCH set and the second EPDCCH set, wherein the first EPDCCH set composed of four PRBs corresponds to an RBG having four PRBs included in the narrowband and the second EPDCCH set composed of two PRBs corresponds to the remaining PRBs in the narrowband.

In the base station of the present disclosure, when the RBG size is 4 and there is no RBG having four PRBs in the narrowband, the control circuitry allocates the MPDCCH to the first EPDCCH set and the second EPDCCH set, wherein the first EPDCCH set composed of two PRBs corresponds to an RBG having three PRBs in the narrowband and the second EPDCCH set composed of four PRBs corresponds to the remaining PRBs in the narrowband.

A base station of the present disclosure includes: control circuitry that determines, based on an offset for defining a frequency position of a narrowband composed of a plurality of contiguous PRBs (physical resource blocks), a resource block group (RBG) size of a system band, and a type of the narrowband, PRBs to which a PDSCH (physical downlink shared channel) is to be allocated in the narrowband; and a transmitter that transmits resource assignment bits for notifying the determined PRBs and the PDSCH allocated to the determined PRBs. In the base station, when the RBG size is 4 and the plurality of contiguous PRBs are six contiguous PRBs, the narrowband includes a first type of narrowband in which a first group composed of four PRBs that are located lower in frequency among the six contiguous PRBs corresponds to one RBG and a second group composed of the remaining two PRBs that are located higher in frequency corresponds to a part of another RBG and a second type of narrowband in which a third group composed of four PRBs that are located higher in frequency among the six contiguous PRBs corresponds to one RBG and a fourth group composed of the remaining two PRBs that are located lower in frequency corresponds to a part of another RBG, and wherein resources included in the first group of the first type of narrowband and resources included in the third group of the second type of narrowband are associated with a first value of the resource assignment bits, and resources included in the second group of the first type of narrowband and resources included in the fourth group of the second type of narrowband are associated with a second value of the resource assignment bits.

In the base station of the present disclosure, PRBs to which the PDSCH is to be allocated in the first type of narrowband are obtained by inverting PRBs to which the PDSCH is to be allocated in the second type of narrowband in a frequency direction.

In the base station of the present disclosure, PRBs to which the PDSCH is to be allocated in the second type of narrowband are obtained by cyclically shifting PRBs to which the PDSCH is to be allocated in the first type of narrowband by two PRBs.

A terminal of the present disclosure includes: control circuitry that determines, based on an offset for defining a frequency position of a narrowband allocated to an MPDCCH and a resource block group (RBG) size of a system band, allocations of a first EPDCCH (enhanced physical downlink control channel) set and a second EPDCCH set that constitute the MPDCCH, the MPDCCH being a PDCCH (physical downlink control channel) for MTC (Machine-Type Communications), the second EPDCCH set having a different number of PRBs (physical resource blocks) from the first EPDCCH set; and a receiver that receives a control signal according to the allocations of the first EPDCCH set and the second EPDCCH set. In the terminal, the control circuitry controls a number of RBGs in which both the first EPDCCH set and the second EPDCCH set are allocated to be zero or one.

A terminal of the present disclosure includes: a receiver that receives resource assignment bits from a base station and a PDSCH (physical downlink shared channel) allocated to PRBs (physical resource blocks); and control circuitry that determines, based on an offset for defining a frequency position of a narrowband composed of a plurality of contiguous PRBs, a resource block group (RBG) size of a system band, a type of the narrowband, and the resource assignment bits, PRBs to which the PDSCH is to be allocated in the narrowband. In the terminal, when the RBG size is 4 and the plurality of contiguous PRBs are six contiguous PRBs, the narrowband includes a first type of narrowband in which a first group composed of four PRBs that are located lower in frequency among the six contiguous PRBs corresponds to one RBG and a second group composed of the remaining two PRBs that are located higher in frequency corresponds to a part of another RBG and a second type of narrowband in which a third group composed of four PRBs that are located higher in frequency among the six contiguous PRBs corresponds to one RBG and a fourth group composed of the remaining two PRBs that are located lower in frequency corresponds to a part of another RBG, and wherein resources included in the first group of the first type of narrowband and resources included in the third group of the second type of narrowband are associated with a first value of the resource assignment bits, and resources included in the second group of the first type of narrowband and resources included in the fourth group of the second type of narrowband are associated with a second value of the resource assignment bits.

A transmission method of the present disclosure includes: determining, based on an offset for defining a frequency position of a narrowband allocated to an MPDCCH and a resource block group (RBG) size of a system band, allocations of a first EPDCCH (enhanced physical downlink control channel) set and a second EPDCCH set that constitute the MPDCCH, the MPDCCH being a PDCCH (physical downlink control channel) for MTC (Machine-Type Communications), the second EPDCCH set having a different number of PRBs (physical resource blocks) from the first EPDCCH set; and transmitting a control signal according to the allocations of the first EPDCCH set and the second EPDCCH set. In the transmission method, a number of RBGs in which both the first EPDCCH set and the second EPDCCH set are allocated is zero or ones.

A reception method of the present disclosure includes: determining, based on an offset for defining a frequency position of a narrowband allocated to an MPDCCH and a resource block group (RBG) size of a system band, allocations of a first EPDCCH (enhanced physical downlink control channel) set and a second EPDCCH set that constitute the MPDCCH, the MPDCCH being a PDCCH (physical downlink control channel) for MTC (Machine-Type Communications), the second EPDCCH set having a different number of PRBs (physical resource blocks) from the first EPDCCH set; and receiving a control signal according to the allocations of the first EPDCCH set and the second EPDCCH set. In the transmission method, a number of RBGs in which both the first EPDCCH set and the second EPDCCH set are allocated is zero or one.

The present disclosure is applicable to a base station, a terminal, a transmission method, and a reception method that are used in MTC (Machine-Type Communications).

What is claimed is:

1. An integrated circuit comprising:
   reception circuitry which, in operation, controls a reception of control information including a resource indication value (RIV) which indicates one or more resource blocks (RBs); and
   control circuitry which, in operation, controls a demodulation of a physical downlink shared channel (PDSCH) based on the control information,
   wherein a same value of the RIV indicates different frequency positions of the one or more RBs on an allocated narrowband within a system band based on a frequency position of the allocated narrowband and a frequency position of resource block groups (RBGs) of the system band.

2. The integrated circuit according to claim 1, wherein, for a starting frequency position of the one or more RBs, the same value of the RIV indicates a boundary of the allocated narrowband in a first case, and indicates non-boundary of the allocated narrowband in a second case.

3. The integrated circuit according to claim 2, wherein
   the first case is a case where the frequency position of the allocated narrowband is started from a boundary of the RBGs, and
   the second case is a case where the frequency position of the allocated narrowband is started from a frequency position different from the boundary of the RBGs.

4. The integrated circuit according to claim 1, wherein
   a boundary of the frequency position of the allocated narrowband is different from a boundary of the frequency position of the RBGs.

5. The integrated circuit according to claim 1, wherein
   a size of the RBGs is smaller than a size of the allocated narrowband, and the size of the RBGs is specified according to a number of RBs that is included in the system band.

6. The integrated circuit according to claim 1, wherein another control information relating to the allocated narrowband is indicated from a base station.

7. The integrated circuit according to claim 1, wherein the allocated narrowband is indicated by an offset, the offset being different according to a number of RBs that is included in the system band.

8. The integrated circuit according to claim 1, wherein
in a case of a frequency hopping, a starting frequency position of the one or more RBs on the allocated narrowband in a first time is different from that in a second time, based on the frequency position of each allocated narrowband of the first time and the second time, and on the frequency position of the RBGs of the system band.

* * * * *